Jan. 16, 1962 W. E. RISE 3,016,657
APPARATUS FOR MANUFACTURING PRE-AIMED LAMPS
Filed May 22, 1958 9 Sheets-Sheet 1

INVENTOR.
William E. Rise
BY
R. F. Barnard
ATTORNEY

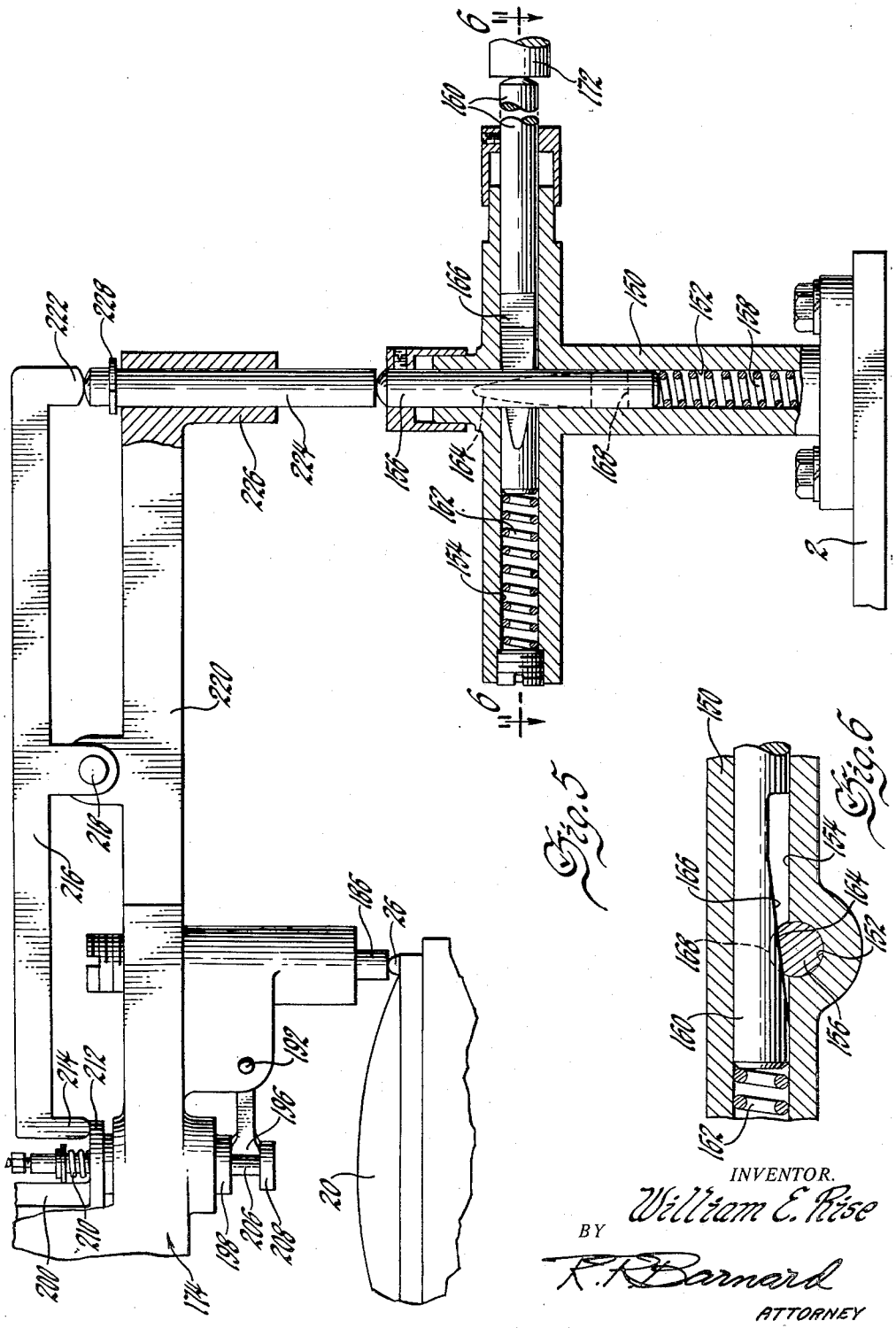

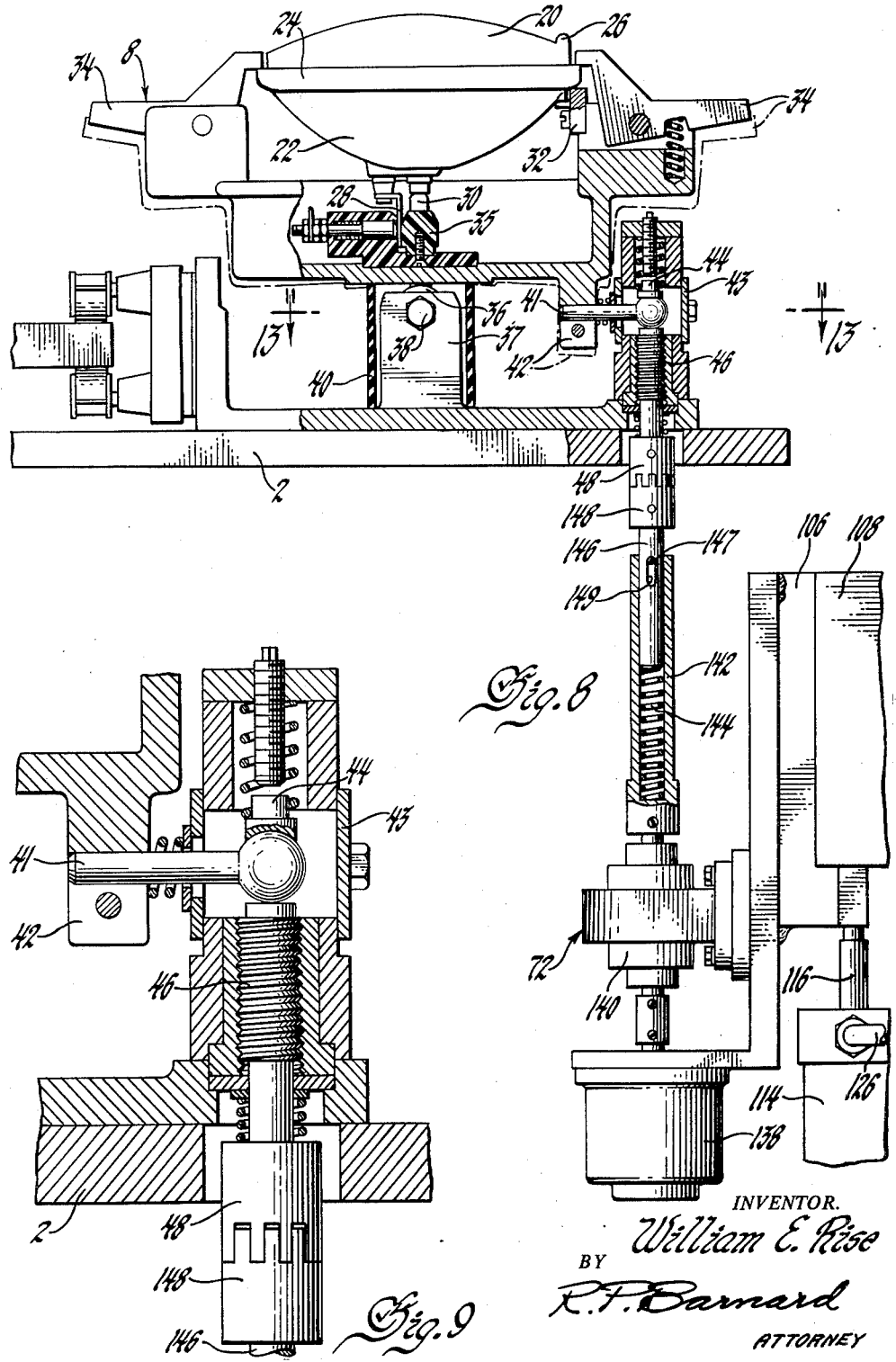

Jan. 16, 1962 W. E. RISE 3,016,657
APPARATUS FOR MANUFACTURING PRE-AIMED LAMPS
Filed May 22, 1958 9 Sheets-Sheet 8

INVENTOR.
William E. Rise
BY R. F. Barnard
ATTORNEY

Jan. 16, 1962 W. E. RISE 3,016,657
APPARATUS FOR MANUFACTURING PRE-AIMED LAMPS
Filed May 22, 1958 9 Sheets-Sheet 9

INVENTOR.
William E. Rise
BY R. F. Barnard
ATTORNEY

United States Patent Office 3,016,657
Patented Jan. 16, 1962

3,016,657
APPARATUS FOR MANUFACTURING
PRE-AIMED LAMPS
William Ellsworth Rise, Detroit, Mich., assignor to General Motors Corporation, Detroit, Mich., a corporation of Delaware
Filed May 22, 1958, Ser. No. 737,160
15 Claims. (Cl. 51—134)

This invention relates to the manufacture of lamps and more particularly, to apparatus for manufacturing projection lamps of the type which are provided with an aiming plane having a known disposition with respect to the direction of the light beam projected therefrom. Lamps of this type are referred to herein as pre-aimed lamps. The type of pre-aimed lamp referred to in conjunction with the illustrative embodiment of this invention is fully described and claimed in the United States patent application Serial No. 515,684, entitled Pre-Aimed Light Projector, filed June 15, 1955, now United States Patent 2,870,362 issued January 20, 1959 to Charles F. Arnold and Edward N. Cole, and assigned to the assignee of this invention.

The feature of pre-aiming, such as that disclosed in the aforementioned patent, permits aiming of a projection lamp upon its installation for use by means of a geometrical instrument, and with precision previously obtained only by optical aiming. In general, this is accomplished by providing on the lamp structure an aiming plane having a known angular relation to the direction of the light beam projected from the lamp. The desirability of pre-aimed projection lamps, especially vehicle headlamps, becomes apparent from considerations of prior known lamp production techniques and desired lamp performance.

In the manufacture of projection lamps such as vehicle headlamps, optical imperfections occur among successive lamps manufactured by the same apparatus and technique. This optical imperfection is manifested by lack of uniform relationship between the light beam direction and a selected geometrical axis of the lamp structure. Such relationship for each lamp is unknown and varies randomly because of insufficient precision in the relative positioning and structural characteristics of the parts of the optical system. Although there has been much effort to improve the manufacturing technique to insure the required precision, this effort has not yielded a commercially successful, optically perfect lamp. Consequently, the aiming of projection lamps, and particularly vehicle headlamps, with great accuracy has constituted an important problem in the development of improved vehicle lighting.

The numerous approaches in the prior art to the problem of aiming vehicle headlamps may be characterized generally as either optical aiming or geometrical aiming. In optical aiming, the lamp is mounted on the vehicle and illuminated; the light beam is directed upon a simple, remotely located aiming screen, or a more complex optical equivalent thereof, and beam direction is positioned by directional adjustment of the lamp. Optical aiming of this type has proved to be disadvantageous because it requires elaborate equipment; it is, however, quite accurate. In geometrical aiming, the lamp is mounted on the vehicle and a selected axis of the lamp structure is directionally adjusted with reference to one or more axes of the vehicle. Geometrical aiming is highly advantageous in that the aiming apparatus required is simple and inexpensive. The aiming may be performed quickly and without the necessity of large space. On the other hand, until the development of the pre-aimed lamp, geometrical aiming was inaccurate because the relation between the projected light beam direction and the selected axis of the lamp structure was unknown and varied randomly from lamp to lamp manufactured successively according to known manufacturing techniques. In the pre-aimed lamp, however, this relation is incorporated with a known value into the lamp structure. Thus, geometrical aiming may be accomplished with the precision of optical aiming.

The commercial practice in the manufacture of conventional lamps affords compelling advantages of efficient production even though it yields optically imperfect lamps. It is desirable, of course, to retain these advantages in the production of pre-aimed lamps. However, the provision of the pre-aimed feature requires additional procedures in the manufacture of projection lamps and, in order for a pre-aimed lamp to be produced economically so that it may attain widespread acceptance, production apparatus capable of high volume production is necessary. The production rate of the apparatus for providing the pre-aimed feature must be consistent with that of the apparatus for assembling the lamp itself. Additionally, the apparatus must be capable of performing the necessary operations upon the lamp structure with great precision so that each lamp may be aimed by a geometrical instrument with the accuracy of optical aiming.

In the copending United States application Serial No. 531,886, entitled Headlamp Pre-Aiming Apparatus, filed on September 1, 1955 in the names of Harold E. Todd et al., now United States Patent 2,880,557 issued April 7, 1959 there is disclosed one type of apparatus for manufacturing pre-aimed lamps of the type shown in the Arnold and Cole patent aforementioned. Generally speaking, the apparatus disclosed in the Harold E. Todd et al. patent includes an aiming station in which a given lamp is angularly adjusted until such time as the direction of the beam projected therefrom is placed in a desired position relative to a reference plane, a probing or gauging station in which the relative height of spaced projections or bosses on the lamp lens is measured, and a grinding station in which glass is ground from the lamp lens projections in accordance with information gained from the probing or gauging station to accurately form the aforementioned aiming plane in a predetermined known position with respect to the direction of the light beam projected from the lamp. The apparatus of the Todd et al. patent has been found to be capable of performing the necessary operations upon the lamp structure in defining the aiming plane with great precision, so that each lamp may be aimed by a geometrical instrument with the accuracy of optical aiming. However, as compared with the apparatus of this invention, the apparatus described in the Todd et al. patent is relatively complicated particularly with respect to the electrical and fluid-operated control system including an electric memory unit controlling the sequence of operations performed on the lamp in accordance with determinations made at the probing or gauging station.

Consequently, it is a general object and feature of this invention to provide an apparatus for manufacturing projection lamps of the pre-aimed type which is of a simplified construction, but which will manufacture pre-aimed lamps with the necessary precision.

It is yet another object and feature of this invention to provide apparatus for optically aiming the light beam of a projection lamp, and for providing the lamp structure with an aiming surface in a known relation to the direction of the light beam projected from the lamp so that the lamp is adapted for geometrical aiming with optical precision, and which apparatus is characterized by a control system functioning with respect to certain of the operations of the apparatus which is relatively simple as compared to known apparatus of this type.

It is yet another object and feature of this invention to provide automatic apparatus for optically aiming and locating the light beam from a projection lamp with respect to a reference plane, determining the structural alteration required for providing an aiming plane on the lamp, and altering the structure in accordance with that determination, and in which mechanical memory means is employed in transferring the determination of the structural alteration required to the means for altering the structure of the lamp.

It is yet a more specific object and feature of this invention to provide a mechanical memory unit which is extremely simple in structure and function, and which unit is readily adaptable for use in many work-performing operations, as well as lamp manufacturing apparatus of the type herein disclosed, to transfer information gained at one work station to another station in which the work-piece is to be operated upon.

It is yet another object and feature of this invention to provide a mechanical memory unit for lamp manufacturing apparatus of the type including a probing and grinding station, and in which the mechanical memory unit is adapted to be set in an adjusted position by a determination made at the probing station as to the relative heights of the projections on the lamp lens from which the aiming plane is to be formed at the grinding station, and in which the setting of the mechanical memory unit is controlled by means responsive to the presence of a defective lamp or a lamp on which no grinding operation is required in order to establish a memory unit setting which will preclude operation of the grinding mechanism on the lamp structure.

In general, these and other objects, features and advantages of this invention are obtained by providing a dirigible support head for the respective lamps permitting their displacement about coordinate axes with reference to an optical aiming means adapted to detect the directivity of the light beam projected from the lamp. The light beam direction is established in a desired position with respect to the optical aiming means, and the lamp is secured in this position. Selected surface portions of the lamp from which the aiming plane is to be formed are then subjected to a probing operation whereby the relative heights of the respective surface portions are determined and a mechanical memory unit set accordingly. Thereafter, the heights of the aforementioned selected lamp surface portions are altered where required in accordance with the setting of the mechanical memory unit to define an aiming plane having a known relation with respect to the direction of the light beam, or a selected portion of the light rays, projected from the lamp. Moreover, the apparatus for determining the relative heights of the lamp surface portions aforementioned includes a control mechanism which will function to set the mechanical memory unit to preclude any grinding operation if the particular lamp in question is either defective or does not require any grinding operation.

A more complete understanding of this invention and the manner in which the foregoing objects, as well as others, are attained will result from the detailed description which follows taken in conjunction with the accompanying drawings in which:

FIGURE 5 is a fragmentary enlarged view taken on line 5—5 of FIGURE 1, partly in section and partly broken away, to show the probing station including the mechanical memory unit;

FIGURE 6 is a fragmentary view, partly in section, taken on line 6—6 of FIGURE 5;

FIGURE 8 is an elevational view, partly in section and partly broken away, of the lamp support and adjustment mechanism therefor utilized at the aiming station;

FIGURE 9 is an enlarged view of a portion of FIGURE 8 illustrating certain details of the lamp adjustment mechanism at the aiming station;

Figure 2:
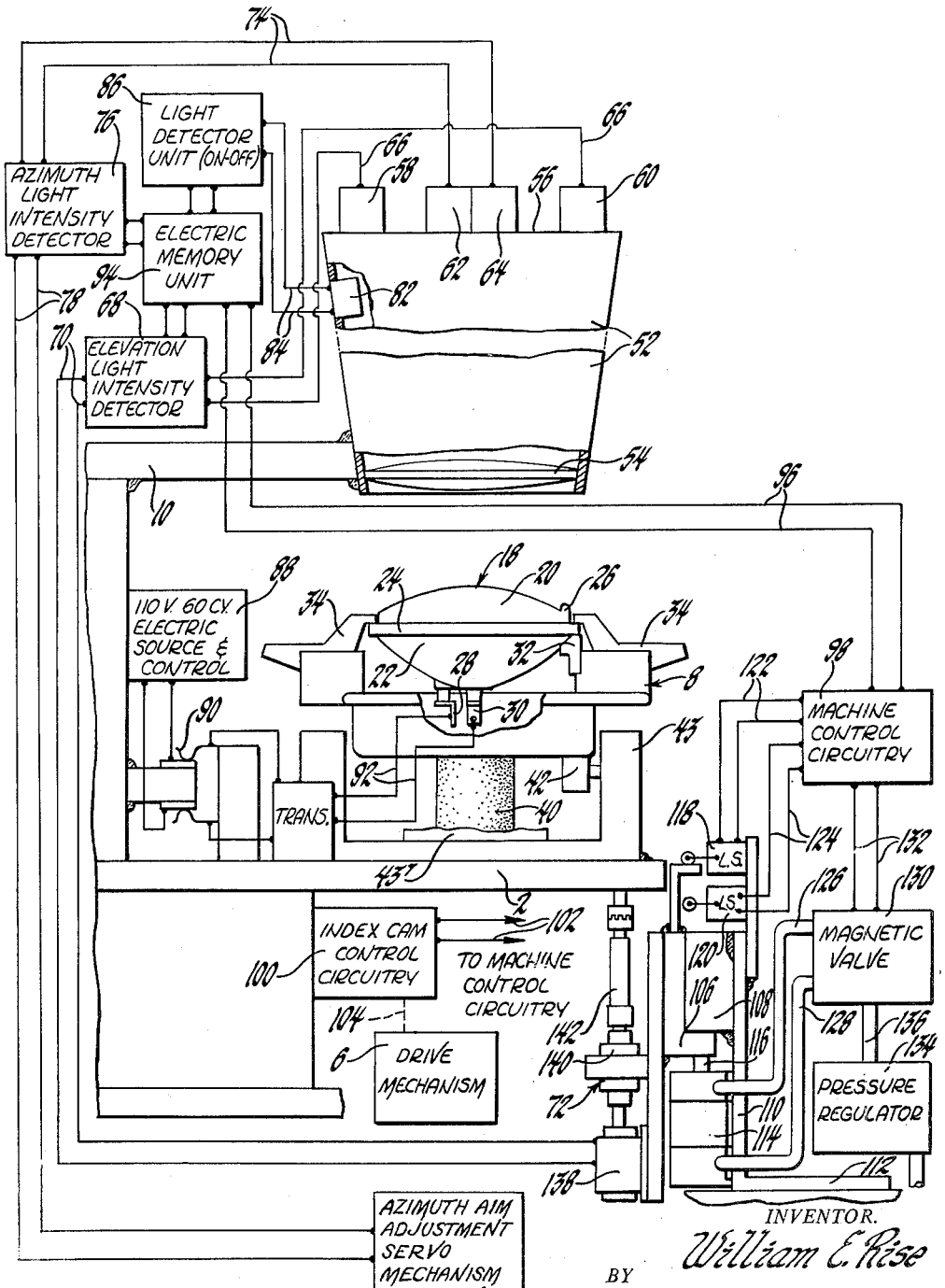
FIGURE 2 is a schematic and diagrammatic view in elevation of the aiming station of the apparatus.
Figure 3:
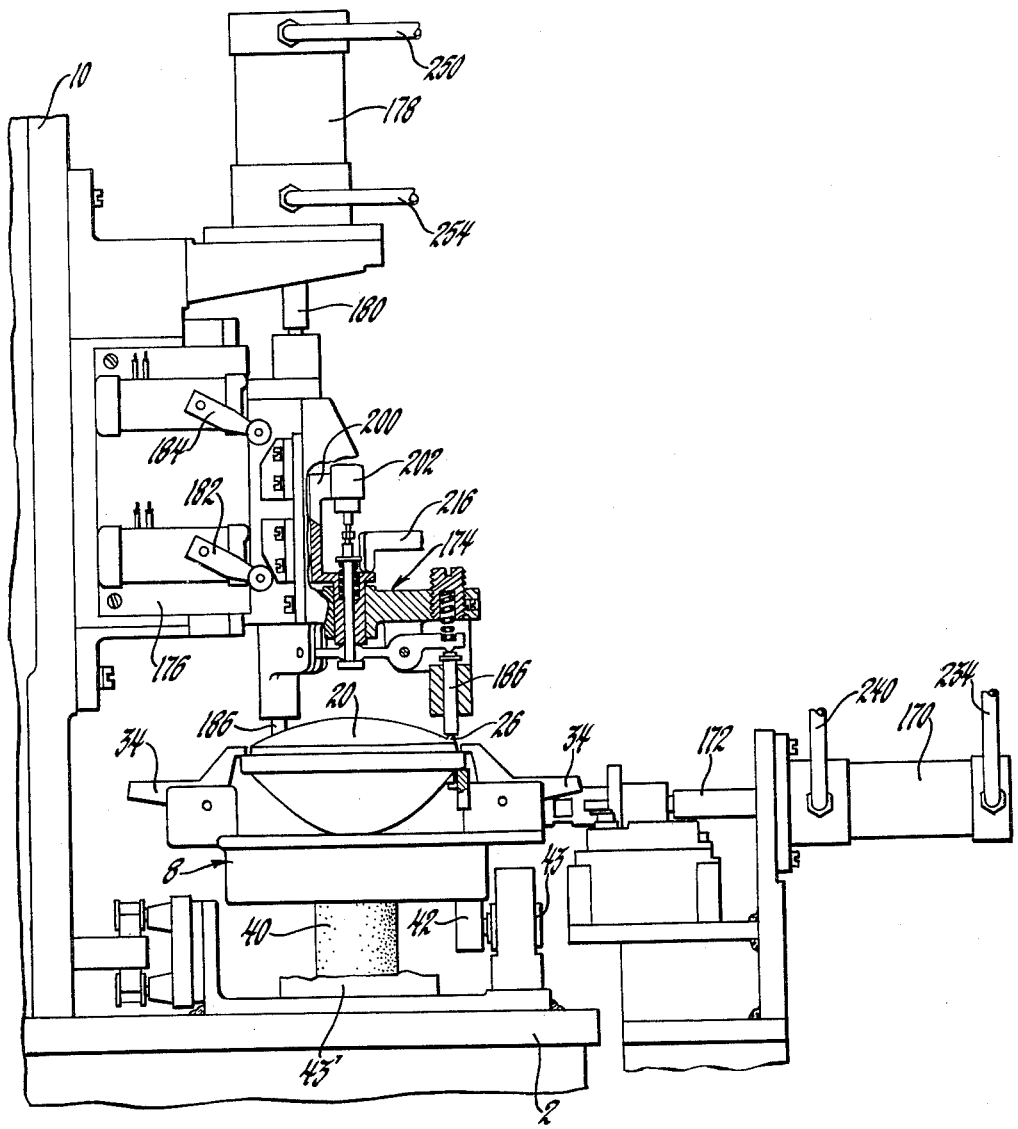
FIGURE 3 is a view, taken on line 3—3 of FIGURE 1, partly in section and partly broken away, to illustrate certain details of the probing station.
Figure 4:
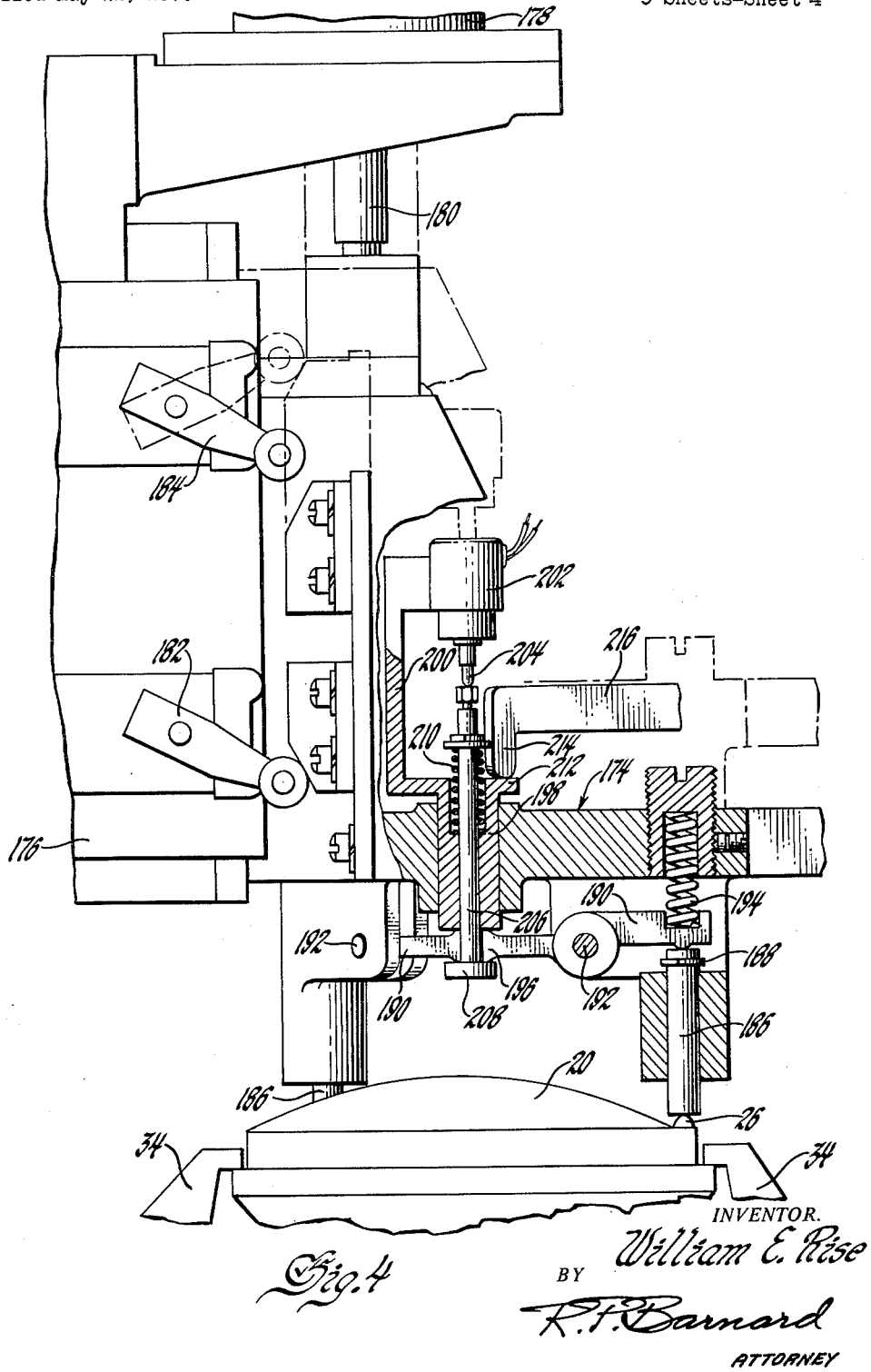
FIGURE 4 is an enlarged view of a portion of FIGURE 3 illustrating certain details of the apparatus.
Figure 7:
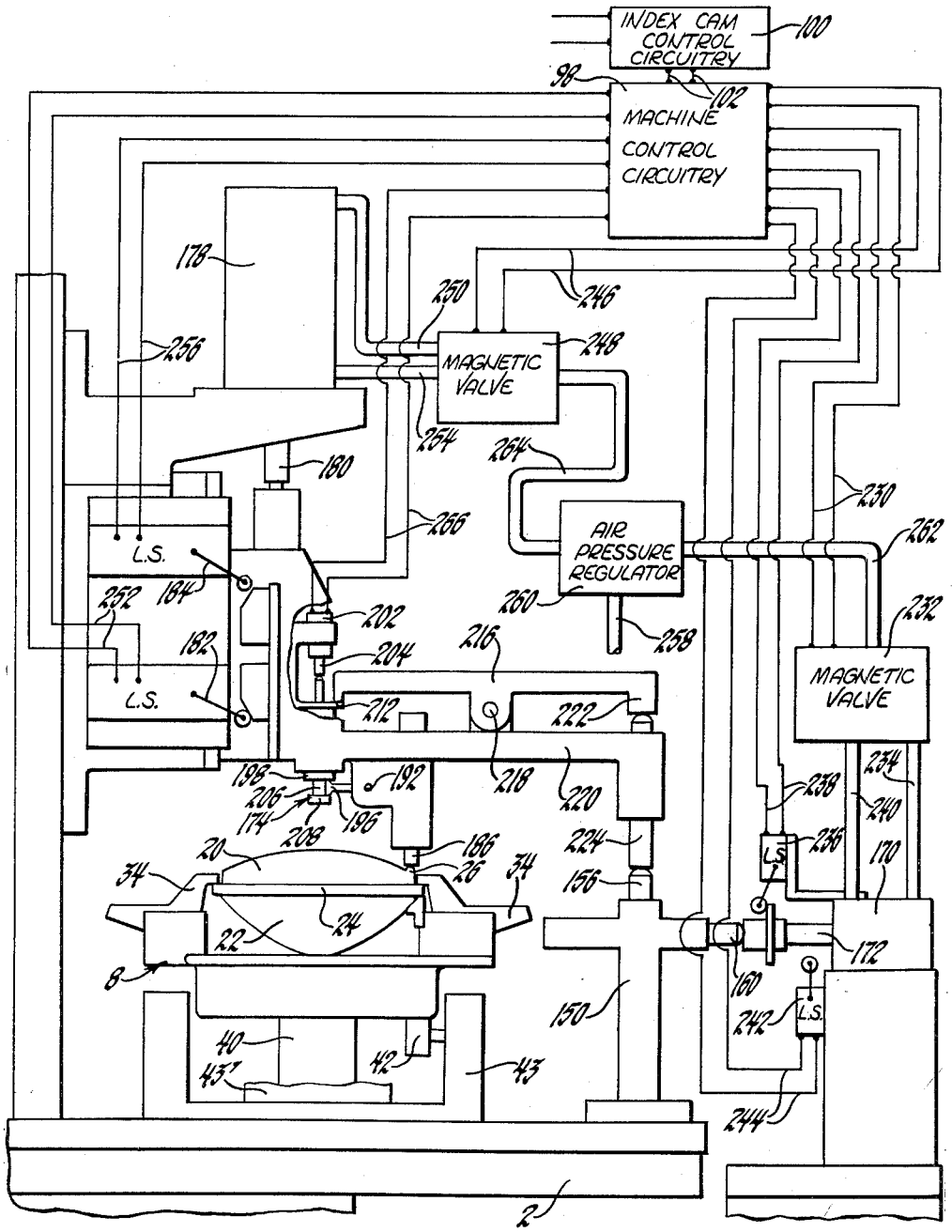
FIGURE 7 is a schematic and diagrammatic view in elevation of the probing station of the apparatus.
Figure 12:
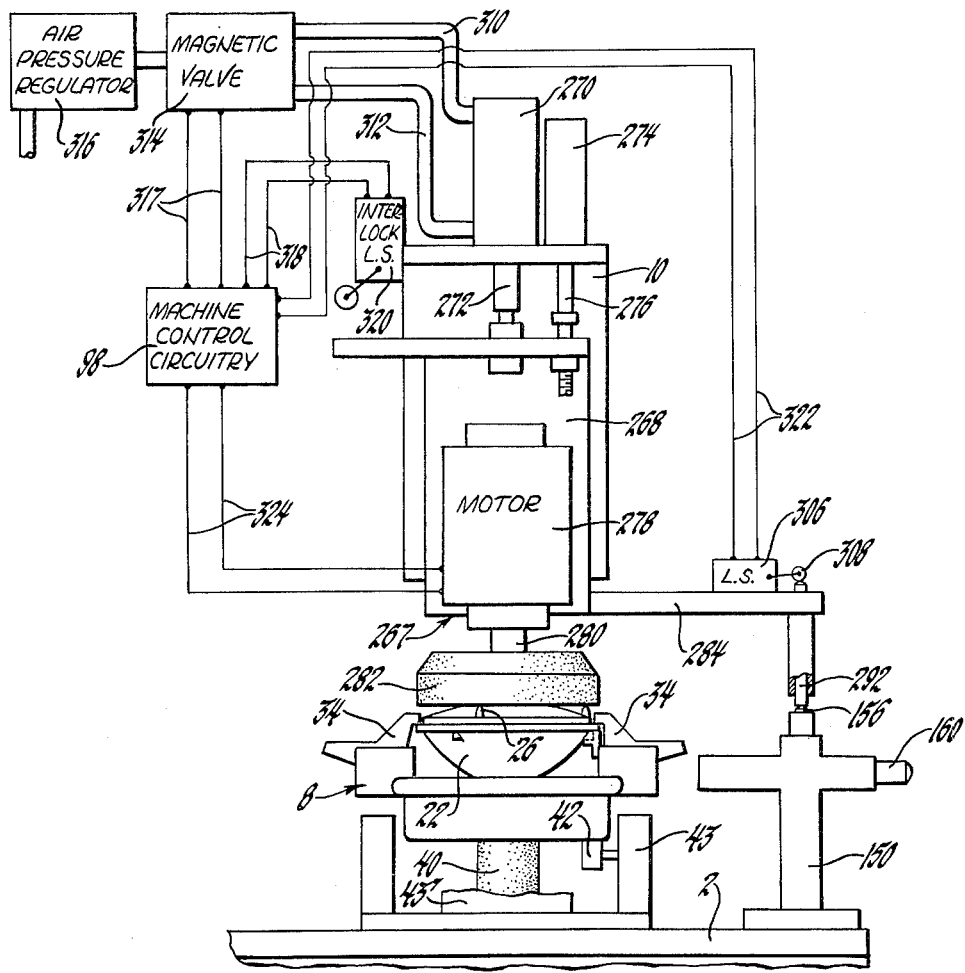
FIGURE 12 is a schematic and diagrammatic view in elevation of the grinding station.
Figure 13:
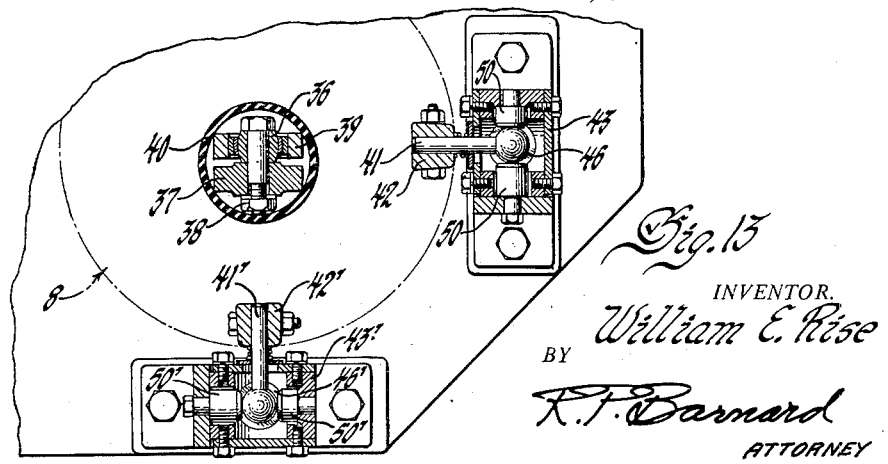
FIGURE 13 is a fragmentary sectional view taken on line 13—13 of FIGURE 8.

In the interest of clarity, the apparatus is represented in certain of the drawings, and particularly FIGS. 2, 7 and 12, in a somewhat schematic and diagrammatic manner. To emphasize the inventive features and to avoid obscuring the invention with detail, conventional components necessary to an operative system are represented schematically or symbolically. In particular, the electronic, electrical and fluid-operated control components which are of conventional design are represented in block diagram, and mechanical connections and devices commercially available or well known in the art are represented schematically.

General description of the apparatus

Figure 1:
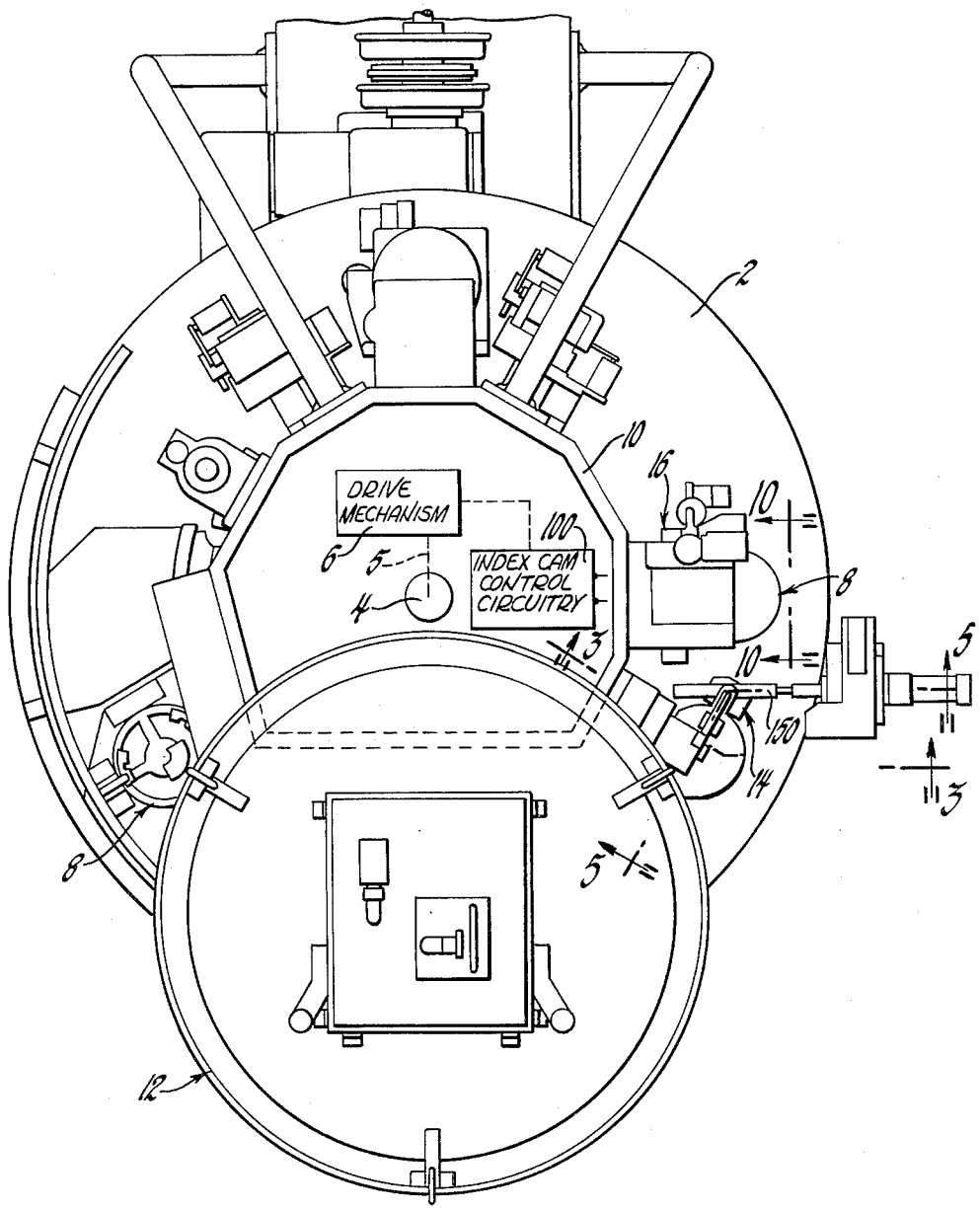
FIGURE 1 is a plan view showing the general disposition of the apparatus of this invention.

Referring now to FIG. 1 of the drawings, there is shown an illustrative embodiment of the invention in a turret type machine adapted for a high rate of production of pre-aimed projection lamps and, specifically, vehicle headlamps of the type including an integrally joined reflector and lens enclosing a light source, and which are known in the art as a sealed beam lamp. A rotatable table or turret 2 is supported for rotation upon a shaft 4 which is connected, as indicated schematically at 5, to be driven by the intermittent drive mechanism 6. The table or turret 2 supports a plurality of identical support heads 8 in equally spaced relation about the circumference of the turret. A superstructure 10 which is fixed relative to the rotatable table 2 supports a plurality of operating stations including an aiming station 12, probing station 14 and grinding station 16.

The drive mechanism 6 includes a sequence timer adapted to impart intermittent rotation to the turret or table 2 causing each of the support heads 8 to advance one station during a drive interval, and to remain stationary at such station during a dwell interval. Thus, operations are performed concurrently in the respective operating stations thereby resulting in apparatus for continuously manufacturing pre-aimed projection lamps. It is not considered necessary to explain the general arrangement of the apparatus more fully inasmuch as it is, as thus far described, well known in the art of lamp manufacture.

The details of the respective support heads 8 will now be described with particular reference to FIGS. 2, 8, 9 and 13. Each of the support heads 8 has a cup-like configuration adapted to receive a projection lamp 18 comprising a lens 20 and reflector 22 which have their peripheries fused together to form a rim 24. The surface of the lamp lens is provided with plural glass projections or bosses 26 spaced circumferentially thereabout, and which are utilized to form the aiming plane of the pre-aimed lamp. The base of the reflector of such a lamp is also provided with three symmetrically spaced metal terminals, with one terminal forming a ground connection while the other two terminals are electrically connected, respectively, to upper and lower beam filaments fixed within the lamp envelope. For the purpose of this illustration, only the terminal 28 connected to the upper beam filament and the terminal 30 connected to ground are shown. The rear surface portion of the peripheral rim 24 of the sealed lamp unit is adapted to be nested or seated on a plurality of spaced support members 32 only one of which is shown in the drawings. A plurality of circumferentially spaced levers 34 are pivotally connected to each of the support heads, and are spring-biased into clamping engagement with the peripheral rim 24 of each lamp to retain the latter seated in its support head.

Referring particularly to FIG. 8, it may be seen that the floor of each support head 8 is provided with an electrical receptacle 35 adapted to receive the aforementioned terminals 28 and 30 when a given lamp is placed in the support head at a suitable loading station. The receptacle 35, and therefore terminals 28 and 30, is adapted to be placed in an electrical circuit to illuminate a lamp filament, preferably the upper beam filament in a multiple filament vehicle headlamp, upon indexing a given loaded support head to the aiming station 12 as will appear hereinafter.

Each of the support heads 8 is adapted to be universally pivotally adjustably supported on the table 2 by a socket connection comprising a bearing member 36 including a semi-spherical bearing surface fixedly secured to a bracket 37 upstanding from the table 2 by the bolt 38, the base of the support head being provided with a depending socket member 39 having a suitable semi-spherical bearing surface surrounding and supported on the aforementioned semi-spherical bearing surface of the member 36. The aforementioned socket connection is enclosed within a housing 40 suitably made of an insulating material. The center of adjustment of the aforementioned members 36 and 39 is spaced from the lamp lens 20 a distance equal to the spherical radius of the latter to minimize lateral shifting movement of the lamp bosses 26 as the support head 8 is adjusted by a mechanism now to be described.

Two ball-headed pins 41 and 41' are rigidly secured to spaced skirts 42 and 42' depending from each support head, and project laterally outwardly therefrom at right angles to each other into the housings 43 and 43', respectively. Inasmuch as these two housings contain identical structure, only the housing 43 will be described with particular reference to FIGS. 8 and 9, primed numerals indicating corresponding structure in the housing 43'. The housing 43 includes a spring-biased cap member 44 yieldably urging the ball-headed pin 41 against an adjustable screw member 46 threadably received within the housing and adapted to be driven by a jaw clutch member 48 with which it is rigidly secured. The ball-head of the pin 41 is guided for vertical movement within the housing 43 by opposed guide pins 50 secured in the walls of the housing. The threaded adjustment members 46 and 46' are adapted to be independently engaged and actuated, respectively, by elevational aim adjusting and azimuth aim adjusting mechanisms to be described hereinafter.

From the above description it will be apparent that adjusting the vertical position of the ball-headed pin 41 will result in adjusting pivotal movement of the support head 8 about the axis defined by the center of the socket connection in housing 40 and the axis of the ball-headed member 41'. As will appear from the description of the aiming station to follow, this adjustment will be made to properly position the aim of the lamp vertically or in elevation and, consequently, the aforementioned axis of adjustment defined by the socket connection and the ball-headed pin 41' will hereinafter be referred to as the vertical or elevation aim adjustment axis. Similarly, adjustment of the other ball-headed member 41' will result in pivoting adjusting movement of the support head 8 about an axis defined by the center of the socket connection in the housing 40 and the ball-headed pin 41. This adjustment corresponds to properly orienting the aim of the lamp horizontally or on an azimuth and, consequently, this axis of adjustment will hereinafter be referred to as the horizontal or azimuth aim adjustment axis.

When the intermittent drive mechanism 6 is energized, the turret 2 carrying the respective support heads 8 is rotatably driven in a counterclockwise direction viewing the apparatus in FIG. 1, and a certain support head is indexed into a suitable loading station prior to entering aiming station. At this station, a dwell interval occurs during which an operator loads a projection lamp 18 into the available support head 8, and the lamp is secured in position by means of the pivotal clamps 34.

*The aiming station*

After the loading operation, the drive mechanism 6 is again energized and the turret 2 is rotated thereby indexing the loaded support head from the loading station to the aiming station 12. A dwell interval of drive mechanism 6 then occurs. At the aiming station, automatic aiming apparatus is provided to effect an aiming operation on the lamp during the dwell interval of the turret 2. As shown in FIG. 2, the superstructure 10 supports an enclosure 52 which may be provided at its lower end with a fixed condensing lens 54. The enclosure 52 terminates at its upper end in an aiming screen 56 defining a reference surface or plane aligned with the lens 20 of the lamp and the support head 8. The aiming screen 56 is provided with a pair of spaced apertures disposed on a line extending generally perpendicularly to the aforementioned elevation aim adjustment axis of the support head 8 defined by the socket connection and the ball-headed member 41'. Disposed in alignment with these apertures in the aiming screen and behind the latter are light intensity responsive pick-up elements such as beam elevation photocells 58 and 60, respectively. Similarly, the aiming screen 56 is provided with another pair of spaced apertures disposed on a line extending generally perpendicularly to the aforementioned azimuth or horizontal aim adjustment axis of the support head 8 defined by the socket connection and the ball-headed member 41. Light responsive pick-up elements or azimuth photocells 62 and 64 are disposed in alignment with the aforementioned apertures in the aiming screen and behind the latter.

The respective beam elevation pick-up elements 58 and 60 are respectively electrically connected by the conductors 66 to the elevation light intensity detector 68. An output voltage of the elevation light intensity detector 68 is developed across its output terminals and is applied by conductors 70 to the input terminals of an elevation aim adjustment servo-mechanism indicated generally at 72. By a similar connection, the output signal of the azimuth pick-up elements 62 and 64 are supplied through the conductors 74 to the azimuth light intensity detector 76. The azimuth light intensity detector 76 develops an output voltage across its terminals which is applied by conductors 78 to the input terminals of an azimuth aim adjustment servo-mechanism indicated generally at 80. From the above description, it will be apparent to those skilled in the art that the respective photocells on the aiming screen define coordinate elevation and azimuth aiming axes with reference to which the light beam from the lamp 20 is to be aimed in the aiming station. Whenever the light beam is improperly located with respect to these aiming axes and therefore the light intensity falling on the respective photocells is unbalanced, different output signals are provided by the respective pairs of photocells 58, 60 and 62, 64 thereby resulting in an output voltage from the respective light intensity detectors 68 and 76 to the respective servo-mechanisms 72 and 80. Upon the light beam being properly aimed, a condition of "good null" is achieved in each of the light intensity detectors 68 and 76 thereby interrupting their output voltage to the respective servo-mechanisms 72 and 80 thereby terminating the adjustment action of the latter to properly aim the lamp.

Another light responsive pick-up unit such as the photocell 82 is provided within the enclosure 52 and is electrically connected by the conductors 84 to the light detector unit 86. This photocell is provided to detect if the lamp fails to illuminate in the aiming station for the aiming operation. In this regard, the aforementioned electrical receptacle 35, which receives the terminals 28 and 30 of the lamp, is electrically connected to the power source 88 through the slip brush-bus bar construction 90 and conductors 92.

The elevation light intensity detector 68 and azimuth light intensity detector 76 may be of any conventional well known design suitable for producing an output voltage proportional to the difference in amplitude of a pair of input voltages respectively determined by the intensity of the light falling on the photocells.

Each of the light intensity detectors 68, 76 and 86 are electrically connected by the conductors shown in FIG. 2 to an electric memory unit 94 which, in turn, is electrically connected by the conductors 96 to the machine control circuitry 98. The electric memory unit functions to pre-condition the machine control circuitry 98 to modify operations to be described at the probing station in the case in which a lamp is discovered at the aiming station in which the filament to be illuminated is defective as sensed by the pick-up unit 82, or in the situation in which it is impossible to obtain a "good null" at the aiming station for one reason or another.

Index cam control circuitry 100 is provided for controlling the operation of various components of the apparatus, and is electrically connected by the conductors 102 to the machine control circuitry 98. As will be understood by those skilled in the art, the index cam control circuitry normally includes plural switch means adapted to be sequentially actuated by plural cam means mechanically driven as indicated schematically at 104 by the intermittent drive mechanism 6. Thus, as the drive mechanism sequentially indexes the table among the various operating stations, the index cam control circuitry is actuated to condition the machine control circuitry for performing various operations in a given sequence.

The elevational aim adjustment servo-mechanism 72 and azimuth aim adjustment servo-mechanism 80 are adapted to be drivingly connected with respect to the respective ball-headed members 41 and 41' enclosed within the housings 43 and 43' to adjust the support heads 8 until such time as the direction of the beam projected from the lamp 18 with respect to the aiming screen 56 is in a known desired position as signaled by the respective elevation and azimuth photocell units thereon. Inasmuch as these servo-mechanisms are identical, reference will be made in detail only to the elevational aim adjustment servo-mechanism 72 shown particularly in FIGS. 2 and 8, it being understood that this description applies equally as well to the azimuth aim adjustment servo-mechanism indicated generally at 80.

The elevational servo-mechanism 72 includes a slide 106 adapted for vertical movement in a guide 108 rigidly secured to a bracket 110 fixed to a base member 112 which, in turn, is fixed with respect to the rotating table 2. A feed motor 114 containing a fluid-actuated piston having a piston rod 116 is rigidly secured to the bracket 110, while the piston rod 116 projecting therefrom is secured to the slide 106 to control vertical feed of the elevational aim-adjusting mechanism. Limit switches 118 and 120 are secured to the bracket 110 and are adapted to limit upward and downward movement of the slide 106. These limit switches 118 and 120 are connected, respectively, by the conductors 122 and 124 to the machine control circuitry 98. The double acting piston of the feed motor 114 is adapted to be supplied with fluid under pressure by the conduits 126 and 128 through the magnetically actuated valve 130 connected by the conductors 132 to the machine control circuitry 98. The fluid is supplied from a source, not shown, through the pressure regulator 134 and conduit 136 to the magnetic valve.

The conductors 70 leading from the terminals of the elevational light intensity detector 68 are connected to, in this case, an electric motor 138 connected through suitable reduction gearing 140, if required, to a hollow upright cylindrical spindle 142 containing a spring 144 against which a stub shaft 146 secured to the driving jaw clutch member 148 is seated. The shaft 146 is fixed against rotation with respect to the spindle 142 while being capable of limited axial movement relative thereto by means of a pin 147 secured to the spindle and extending through an elongate slot 149 in the shank of the shaft 146. Naturally, the motor 138, reduction gearing 140 and the mechanism associated therewith are suitably supported on the slide 106 for movement therewith as indicated in FIGS. 2 and 8. Referring to FIG. 9, the pin 147 will normally be in the bottom of the slot 149. However, as the slide 106 is elevated by the feed motor 114 until the limit switch 118 is engaged to discontinue feeding movement, the lost motion connection between the pin 147 and slot 149 permits over-travel of the hollow spindle 142 relative to the shaft 146 to the limited extent required to prevent damaging the operating structure.

At this juncture, the operation of the aiming station apparatus will be described with particular reference to FIGS. 2, 8 and 9, assuming that the loading of a lamp 18 into a support head 8 has been completed at a loading station prior to indexing of the table 2 into the aiming station 12. This description of the operation will be made with reference to three conditions which might occur; that is, a condition in which a good lamp is properly adjusted to obtain "good null" in each of the respective light intensity detectors 68 and 76, and the other conditions in which "good null" cannot be achieved for one reason or another or the filament intended to be illuminated in the lamp fails to light as is sensed by light detector 86.

With respect to the first condition in which a "good null" signal may be achieved for a good lamp, the rotatable table 2 indexes the support head 8 into the aiming station 12 at which time the respective aim-adjustment driving clutches, such as 148 for the elevational aim servo-mechanism 72, are aligned with the driven clutches such as 48, but are disposed downwardly and out of engagement therewith. When the lamp support is fully indexed into the aiming station, a dwell interval for the intermittent drive mechanism 6 occurs. The index cam control circuitry 100 actuates the machine control circuitry 98 which, in turn, actuates magnetic valve 130 to cause motor 114 to feed the elevation aim-adjustment mechanism 72 into driving engagement with the clutch member 48 as shown particularly in FIGS. 8 and 9. Naturally, the same action is occurring with respect to the azimuth aim-adjustment mechanism 80. These respective feed mechanisms then go through a dwell cycle while the aiming operation occurs. Moreover, an electrical circuit is established from the power source 88 to the receptacle 50 to illuminate a filament of the lamp, preferably the upper beam filament in a plural filament vehicle lamp. The beam projected from the lamp falls upon the light detector photocell 82 which provides a signal through the light detector unit 86 to the electric memory unit 94 which stores the information that a good lamp is present for use in conjunction with operation of the machine control circuitry 98 at the subsequent probing station as aforementioned. Additionally, the light beam projected from the lamp falls upon the aiming screen 56 and the elevational photocells 58 and 60, and azimuth photocells 62 and 64.

With respect to the elevational component of beam aim, the intensity of the light impinging upon the respective elevational photocell pick-up units 58 and 60 will deliver signals through the conductors 66 to the elevation light intensity detector 68. If the intensity of light on the respective photocells 58 and 60 is unbalanced, the output voltage of the elevation light intensity detector 68 is applied by the conductors 70 to the electric motor 138 of the elevational aim-adjustment servo-mechanism 72. Drive is then conducted through the jaw clutch members 148 and 48 to the screw member 46 to lift or lower the ball-headed pin 38 until such time as the elevational photocells sense that the beam is properly aimed with respect to its elevational component of directivity. At such time, a "good null" signal is provided to the elevation light intensity detector 68 whereby operation of the electrical motor 138 is discontinued. Similarly, the signals developed by the azimuth pick-up elements 62 and 64 may be initially unequal, and the voltage developed by the azimuth light intensity detector 76 across its output terminals is applied through the conductors 78 to the input terminals of the azimuth aim-adjustment servo-mechanism to adjust the ball-headed member 41' enclosed within the housing 43' to properly aim the lamp beam with respect to its azimuth or horizontal component. The achievement of "good null" is signaled to the electric memory unit 94.

After the elapse of a sufficient time for the aforementioned support head adjustment to occur, the index cam control circuitry 102 signals the machine control circuitry 98 which actuates the magnetic valve 130 to lower the elevational aim-adjustment mechanism 72 thereby disengaging the driving connection between the clutch members 148 and 48. Similarly, the azimuth aim-adjustment mechanism 80 is disengaged.

In the event that the filament of the lamp 18 is defective or for some reason a "good null" cannot be obtained, this information is signalled through one or the other of the light detectors 68, 76 and 86, as the case may be, to the electric memory unit 94 for use in conjunction with the operation of the machine control circuitry 98 at the probing station. However, the apparatus will function as just described with respect to adjustment of the support head 8 in attempting to optically aim the lamp to the desired position.

The support head 8 and the other apparatus at the aiming station is now conditioned to permit the next drive interval of the table 2 to index the lamp to the probing station. Consequently, the intermittent drive mechanism 6 is again energized to result in this indexing movement in which the optically aimed lamp or, alternatively, a defective lamp as the case may be, is indexed to the probing station while a following lamp which has been loaded at the loading station is now indexed into the aiming station for a repeat of the operation previously described.

The probe station

Reference will now be made to FIGS. 3 through 7, inclusive, with respect to a description of the probing station 14 and, in particular, the mechanical memory unit shown particularly in FIGS. 5 and 6. Referring first to the mechanical memory unit, it may be seen to include a housing 150 having intersecting vertical and horizontal bores 152 and 154 therein. This memory unit is adapted to be rigidly bolted to the table 2 adjacent each of the support heads 18. As such, it is indexed with the support heads as the table is rotated. A mechanical memory pin 156 is disposed within the vertical bore 152 against the yieldable spring 158, while a locking pin 160 is disposed within the horizontal bore 154 against the yieldable spring 162. Both of these pins project out of their respective housings as shown particularly in FIG. 5. The memory and locking pins are provided with intersecting locking surfaces 164 and 166, respectively, which are formed at an angle with respect to the axis of reciprocation of the respective pins. From the above description and referring particularly to FIG. 5, it may be seen that movement of the locking pin 160 to the left against the spring 162 will release the memory pin 156 for upward movement under the influence of the spring 158 until such time as the shoulder 168 on the memory pin abuts the locking pin. With the locking pin in this position, the memory pin 156 may be moved downwardly within the bore 152 to any desired adjusted position and locked in this position by releasing the locking pin 160 which will be projected into locking engagement with the memory pin by means of the spring 162.

The means for selectively actuating the locking pin 160 may take the form of a fluid-operated motor 170 securely fixed to the base of the machine so as to be fixed relative to the rotating table 2. A piston is reciprocably disposed within this motor and includes a rod 172 movable against the locking pin 160 to adjust the position of the latter by means to be described hereinafter.

Referring now to the probing station proper, it may be seen to include a probing head indicated generally at 174 which is vertically reciprocably disposed in a bracket 176 secured to the superstructure 10 of the apparatus. A fluid-operated motor 178 is rigidly secured to the superstructure 10 and includes a piston rod element 180 connected to the probing head 174 to control its feed toward and away from the support head 8 in which the lamp is nested. Limit switch 182 on bracket 176 limits downward travel of the probe head 174, while limit switch 184 limits upward travel thereof by control means to be described.

Vertically reciprocably disposed within the probe head 174 are a plurality of probe pins 186 aligned with the projections or bosses 26 on the lamp lens 20. These probe pins are retained within the probe head by any suitable means such as the snap rings 188 which, prior to the probing operation to be described, support the lower ends of the probe pins so as to define a plane in a known position with respect to the reference plane of aiming screen 56, such as being parallel thereto. A probe lever 190 is associated with each of the probe pins 186 and is pivoted intermediate its ends to the probe head at 192. Spring means such as indicated at 194 are contained in the probe head and each engages one end of each of the probe levers 190 urging the latter into abutting engagement with the upper end of its associated probe pin 186. The other ends 196 of the respective probe levers 190 extend inwardly toward each other and terminate in an area substantially centrally of the probe head 174.

A motion-transmitting and master probe switch mechanism is provided centrally of the probe head 174 and includes a bushing member 198 vertically reciprocably mounted in the probe head. A bracket 200 formed integral with the member 198 extends upwardly therefrom and amounts a master probe switch 202 which is adapted to be actuated by movement of the contact member 204 aligned with an opening through the member 198. Relatively movably mounted within the opening in the member 198 in alignment with the contact member 204 is a rod 206 having a radial shoulder or collar 208 at its lower end. The ends 196 of the respective probe levers 190 are seated between the collar 208 on the rod 206 and the lower end of the member 198, while the spring 210 continuously urges the collar 208 and member 198 into embracing engagement with these probe lever ends. Additionally, the spring 210 urges the rod 206 against switch contact member 204 to condition the switch 202 in a reference position.

As the motor 178 is actuated to feed the probe head 174 toward the lamp lens 20, the lower ends of the probe pins 186 which are to engage the lamp projections 26 will define a plane in a known position with respect to the reference plane of the aiming screen 56, such as being parallel thereto as aforementioned. As the probe head is fed toward the lamp until such time as the limit switch 182 is actuated to interrupt this feeding movement, the respective probe pins will engage the respective aiming projections 26 on the lamp. Thus, one of the probe pins 186 will rest upon the highest projection on the lamp in its adjusted position, while another pin will rest upon the lowest of said projections. Moreover, the probe pin which engages the highest projection will be reciprocated to the greatest extent, while the probe pin engaging the lowest projection will be reciprocated to the lowest extent. Consequently, it will be readily seen from FIG. 4 that the pin engaging the highest projection will act through its associated probe lever 190 to move the rod 206 downwardly to its greatest extent, while the probe pin engaging the lowermost projection will act through its associated probe lever to retain the member 198 in its highest position. If the variation in height between the lowest and highest projections is above a predetermined limit, the rod 206 will actuate the switch 202 which is electrically connected to the machine control circuitry in a manner to be described.

Suffice it to say at this juncture that the master probe switch 202 is provided to signal the machine control circuitry when a particular lamp in which a "good null" has been achieved requires a grinding operation on the projections 26 to establish a plane in the desired position with respect to beam directivity. In other words, after the aiming operation previously described, it may frequently occur that the plane defined by the projections 26 in their original condition is properly positioned relative to beam directivity so as to establish the desired aiming plane. Consequently, it is desirable to avoid any subsequent grinding operation because of the danger of breakage of the projections 26 resulting in a rejected lamp. Therefore, the master probe switch 202 will sense the variation between the height of the lowest and highest projection and thereby pre-condition the machine control circuitry as to whether or not the bosses require modification in their heights to provide the aforementioned aiming plane.

It will be remembered that the member 198 will be moved to its position in accordance with the position of the lowest lamp lens projection 26. If a lamp requires grinding pursuant to the signal from the master probe switch 202, it is desirable that this grinding be accomplished on all of the lamp projections. Consequently, the mechanical memory pin 156 previously described is set in accordance with the height of the lowest projection in order to act as a stop at the grinding station to effect grinding of all the lamp projections including the lowest thereof. To this end, the member 198 is provided with a radial shoulder or collar 212 which abuts against one end 214 of a memory pin setting lever 216 which is pivotally connected at 218 intermediate its ends to a bracket 220 projecting outwardly from the probe head 174. The other end 222 of this lever abuts the upper end of a setting pin 224 vertically reciprocably mounted within a bushing 226 at the outer end of the bracket 220. This pin 224 is equipped with any suitable means such as the snap ring 228 to retain it in position in the bushing 226, and its lower end is adapted to be moved against the memory pin 156 upon clockwise movement of the lever 216.

Referring now to the control system shown schematically particularly in FIG. 7, it may be seen to include the previously described electrically connected index cam control circuitry 100 and machine control circuitry 98, the latter in turn being connected electrically to the electric memory unit 94 shown in FIG. 2. The index cam control circuitry acting through the machine control circuitry and the various conductors shown in FIG. 7 functions to operate the various components of the apparatus at the probing station. Thus, the machine control circuitry 98 is connected by the conductors 230 to the magnetic valve 232 to supply fluid through the conduit 234 to one end of the motor 170 to extend the piston rod 172 to unlock the locking pin 160 of the memory unit, the limit switch 236 being provided and connected by the conductors 238 to the machine control circuitry to interrupt this actuation of the motor 170 upon reaching the limit of its travel. Additionally, the magnetic valve 232 controls the supply of fluid through the conduit 240 to the other end of the double-acting motor 170 to retract the rod 172 until such time as the limit of its retraction is reached thereby closing the limit switch 242 electrically connected by the conductors 244 to the machine control circuitry.

Similarly, the machine control circuitry is connected by the conductors 246 to the magnetic valve 248 supplying fluid through the conduit 250 to the motor 178 and feed the probing head 174 downwardly until such time as the limit switch 182 is actuated, the latter being connected by the conductors 252 to the machine control circuitry. Additionally, the feed motor 178 is actuated for retraction through conduit 254 until such time as the limit switch 184 is actuated, the latter being connected by the conductors 256 to the machine control circuitry.

The respective magnetic valves 232 and 248 are each supplied from a source, not shown, through the conduit 258, air pressure regulator 260 and the conduits 262 and 264. The master control switch 202 previously described is connected by the conductors 266 to the machine control circuitry. In a lamp which needs to be ground, it is necessary that the locking pin motor 170 be actuated to retract the rod 172 thereby locking the memory pin 156 in place prior to retraction of the probing head 174. Otherwise, the locking pin 160 would not be released to retain the memory pin 156 in an adjusted position. On the other hand, if a particular lamp does not require grinding, it is desirable that the probe head 174 be elevated thereby permitting the memory pin 156 to be extended to its extreme upward position prior to retraction of the locking pin motor 170 to release the locking pin 160. The significance of this difference of operation will be more readily apparent from a description of the grinding station to follow. However, it may be said that the memory pin 156, while acting as a stop controlling the degree of grinding for the lamp which needs to be ground, also acts as a stop preventing any grinding at all when it is in its elevated position.

At this juncture, it may be noted that the index cam control circuitry 100 acting through the machine control circuitry 98 may normally act through the conductors 246 to retract the probing head 174 prior to retraction of the locking pin motor 170. However, in the event that the probe pins 186 sense a variance in projection height beyond the predetermined limit indicating that a lamp needs to be ground, the master probe switch 202 will be actuated to supply a signal through the conductors 266 to the machine control circuitry to condition the latter for actuation of the locking pin motor 170 prior to retraction of the probe head 174. It should be noted, however, that the master probe switch 202 can also be set so that under normal conditions the locking pin motor 170 will be retracted first followed by retraction of the probe head 174 by the index cam control circuitry, and the probe switch 202 functions upon being actuated to reverse this sequence of operation. The important thing irrespective of the normal sequence of operation of the locking pin motor 170 relative to the feed motor for the probing head 174 under the influence of the index cam circuitry 100 is that actuation of the master probe switch 202 will signal the machine control circuitry whether or not a particular lamp requires grinding so that the memory pin 156 may be locked in an adjusted position accordingly.

The function of the apparatus at the probing station will now be described with reference to the three conditions previously considered with respect to the description of the operation of the apparatus at the aiming station; that is, the condition in which a "good null" is achieved in the aiming station for a lamp which is not defective, and the other conditions in which either "good null" is not achieved in the aiming station or the lamp is defective by reason of its filament failing to illuminate.

Referring first to the "good null" situation, the optically aimed lamp will be indexed into the probing station by the intermittent drive mechanism, and a dwell interval will follow during which time the probing operation occurs. Upon being indexed into the probing station, the lamp is so oriented with respect to the probing head 174 that the respective probe pins 186 are aligned with the respective plural spaced projections 26 on the lamp lens. A this time, the probing head will be disposed for an automatic probing operation; that is, the probing head will be elevated above the position shown in FIGS. 3 through 7, and the memory pin 156 will be locked in a particular adjusted position in which it was placed in a previous cycle of operation.

Upon the dwell interval occurring in the intermittent drive mechanism 6, the index cam control circuitry 100, operating through the machine control circuitry 98, will provide a signal through the conductors 230 to the magnetic valve 232 thereby actuating the fluid motor 170 to extend the piston rod 172 which will abut and move the locking pin 160 against its spring 162, thereby releasing the memory pin 156 which will be projected upwardly to its fullest extent by the spring 158. Thereafter, the index cam control circuitry acting through the conductors 246 will energize the magnetic valve 248 causing the motor 178 to feed the probing head 174 downwardly until such time as the limit switch 182 is closed thereby signalling the machine control circuitry through the conductors 252 to interrupt the downward movement of the probing head. As the probing head moves downwardly so that the respective probe pins 186 engage the respective plural spaced projections 26 on the lamp lens, one of the probe pins will engage the highest lamp projection, while another will engage the lowermost lamp projection. The probe pin which engages the lowermost projection will result in the smallest degree of pivotal movement of its associated probe lever 190 thereby maintaining the member 198 at a particular height within the probing head. This member 198 acting through the lever 216 and setting pin 224 will move the memory pin 156 downwardly against its associated spring 158 into an adjusted position.

At this junction, the sequence of the following operations depends upon whether or not the master probe switch 202 is actuated. Assuming that the lamp needs to be ground, this fact will be signalled to the machine control circuitry 98 by the master probe switch 202 by reason of two particular probe pins 186 respectively engaging the highest and lowest projections 26 on the lens. Thus, the probe pin which engages the lowest projection will position the member 198 as aforementioned, while the probe pin engaging the highest projection will cause its associated probe lever to swing to the greatest extent relative to the other probe levers thereby moving the rod 206 downwardly within the member 198 resulting in actuation of the switch 202. As a result, the probe switch 202 signals the machine control circuitry through the conductors 266 that the lamp requires grinding, and the machine control circuitry, in turn, acts through the conductors 230 to actuate the magnetic valve 232 causing the piston rod 172 to return thereby releasing the locking pin 160 for locking engagement with the memory pin 156 in its adjusted position. Thereafter, the machine control circuitry acting through the conductors 246 will actuate the motor 178 to retract the probing head until such time as the limit switch 184 is closed to signal the machine control circuitry through the conductors 256.

Alternatively, if the variation in height between the highest and lowest lamp projection is such as to not actuate the switch 202 thereby indicating a condition in which the plane defined by the projections 26 is in a known position with respect to the directivity of the light beam, the index cam control circuitry 100 acting through the machine control circuitry 98 will first actuate the feed motor 178 to retract the probing head followed by actuation of the locking pin motor 170 to retract or release the locking pin. Thus, under these circumstances, the sequence of operation with respect to the locking pin motor 170 and probing head motor 178 is reversed. Consequently, inasmuch as the probing head is retracted prior to release of the locking pin, the memory pin 156 will be urged to its uppermost position prior to release of the locking pin to engage the memory pin. Therefore, and as will appear hereinafter with respect to the description of the grinding station, the memory pin in its upper elevated position will provide a stop precluding any grinding operation occurring at all on the lamp projections.

Reference will now be made to the operation of the apparatus in the situation in which no null was achieved at the aiming station or the situation in which the filament of the lamp failed to illuminate at the aiming station. It will be remembered that the existence of either of these conditions at the aiming station was signalled to and stored in the electric memory unit 94 which is connected by the conductors 96 to the machine control circuitry 98. When a lamp in which one or the other of these conditions exist is indexed into the probing station, the electric memory unit 94 will pre-condition the machine control circuitry irrespective of operation of the index cam control circuitry 100 to first actuate the locking pin motor 170 so that it is extended and dwells, followed by retraction of the locking pin motor. The feed motor 178 for the probing head is not actuated. The net result is that in extending the locking pin motor 170 the memory pin 156 is released so as to be projected to its uppermost position in which it is retained upon retraction of the locking pin motor. Consequently, the memory pin will again form a stop utilized at the grinding station, as will be described to prevent a grinding action which would be unnecessary inasmuch as a "good null" was not achieved or the lamp is defective. In this respect, the memory pin serves the same purpose as it does in the situation in which the master probe switch as previously described informs the machine control circuitry that no grinding is required with respect to a good lamp.

The grinding station

Figure 10:
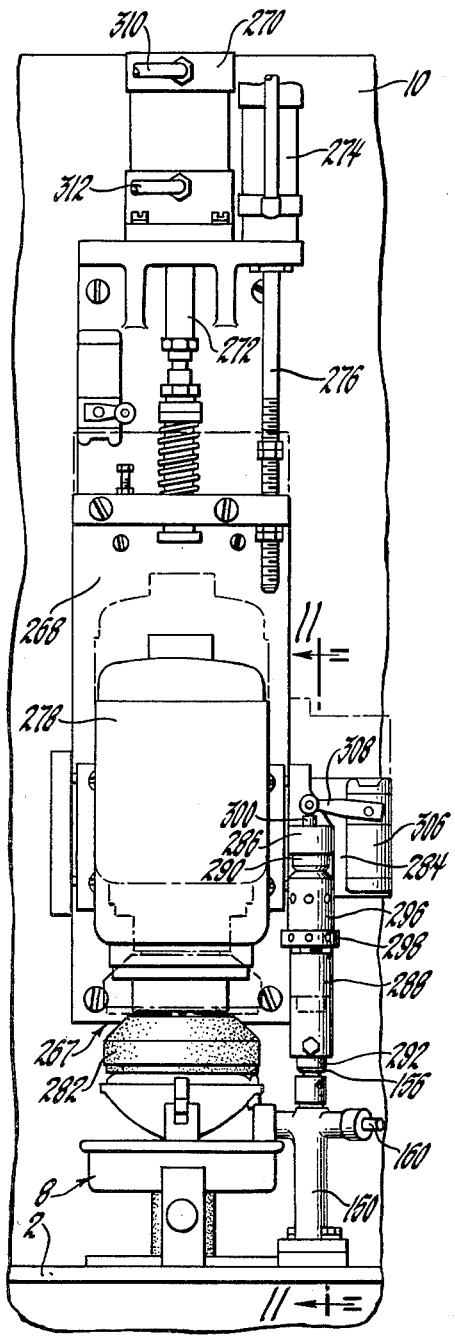
FIGURE 10 is a fragmentary elevational view of the grinding station taken on line 10—10 of FIGURE 1.
Figure 11:
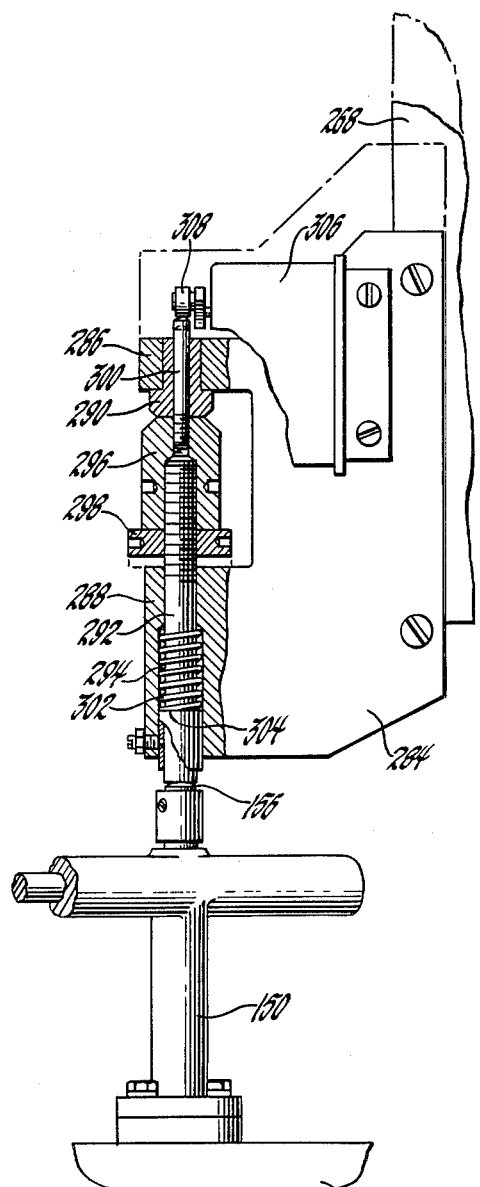
FIGURE 11 is an enlarged fragmentary view taken on line 11—11 of FIGURE 10, partly in section and partly broken away, showing the arrangement of the mechanical memory unit relative to the grinding apparatus.

After one of the operations just described has occurred in the probing station, the intermittent drive mechanism 6 is again actuated to rotate the table 2 and a particular lamp into the grinding station 16 at which time the drive mechanism undergoes a dwell interval. With reference particularly to FIGS. 10, 11 and 12, the apparatus at the grinding station includes the grinding head 267 including a slide 268 suitably guided within a bracket secured to the machine superstructure 10, and adapted to be fed vertically by means of a fluid-actuated motor 270 secured to the superstructure 10 and having its piston rod element 272 connected to the slide 268. A hydro-check type bellows 274, well known in the art, is supported on the superstructure 10 and has its piston rod element 276 also connected to the slide 268. Rigidly supported on the slide 268 for feeding movement therewith is a suitable motor 278 adapted to rotatably drive the spindle 280 to which is secured the grinding wheel 282 having an annular grinding rim of an abrasive material such as diamond chips or dust which is engageable with the plural projections 26 on the lamp. This grinding wheel surface is supported by the aforedescribed structure in a known position, such as parallel, with respect to the reference plane defined by the aiming screen 56 of FIG. 2.

Rigidly secured to the slide 268 is a bracket 284 having vertically spaced legs 286 and 288. The upper leg 286 contains a bushing 290. A stop pin 292 extends through a bore 294 in the lower leg 288 and threadably receives a bushing 296 at its upper end. A locking collar 298 also threadably engages the stop pin 292 to lock the bushing 296 in position. A small pin 300 is threadably received in bushing 296 and telescopes through bushing 290 in bracket leg 286. A spring 302 surrounds stop pin 292 within bore 294 and rests against an annular shoulder 304 on the stop pin 292 urging the latter downwardly relative to bracket 284 until such time as collar 298 engages lower bracket leg 288 as indicated in dotted line in FIG. 11. A limit switch 306 is secured to the bracket 284 and includes a contact member 308 movable upon engagement with pin 300 due to reciprocation of stop pin 292 upon abutting engagement of the lower end thereof with memory pin 156. Such upward reciprocation of stop pin 292 will be limited by engagement of bushings 290 and 296 as indicated in full line in FIG. 11.

The purpose of the movable stop pin 292 is to control the depth of grinding with respect to the lowest lamp projection. In other words, once the grinding wheel 282 is fed into engagement with the aiming projections 26 and begins to grind the latter, the highest projection or projections will be the first to be ground. If the stop pin 292 were rigidly secured in the bracket 284, feed of the grinder would be interrupted just as the grinding surface of the wheel engages the tip of the lowest projection. This is because the memory pin 156 has been set at the probing station to correspond to the height of the lowest lamp projection. However, to insure that an accurate ground aiming plane is provided for each lamp, it is desirable to remove some stock even from the lowest projection of the lamp. Accordingly, the bushing 296 is placed in an adjusted position on the stop pin 292 to provide a predetermined feed into the lowest lamp projection. For example, it is preferable in an apparatus of this type to remove approximately .010 inches from the lowest projection. Consequently, the bushing 296 is placed in a position corresponding to this degree of feed, and the grinding wheel is fed into the lamp projections until such time as the stop pin 292 is lifted to the full line position of FIG. 11. At this time, the limit switch 306 is actuated to signal the machine control circuitry that the grinding head has properly completed its downward feeding movement. Due to the fact that the grinding surface of wheel 282 will wear away in use, adjustable bushing 296 may also be re-adjusted periodically to compensate for this condition.

Referring now to the control system utilized at the grinding station, the conduits 310 and 312 are connected through the magnetic valve 314 and air pressure regulator 316 to a source of fluid pressure, not shown. As set forth with respect to the description of the previous stations, the magnetic valve 314 is adapted to be sequentially activated by the machine control circuitry 98 through conductors 317 in response to the index cam control circuitry 100. The machine control circuitry 98 is connected by the conductors 318 to a limit switch 320 engageable with the slide 268 in retracting movement of the latter to interrupt such retraction, while the aforementioned limit switch 306 fixed to the support bracket 284 is connected by the conductors 322 to the machine control circuitry to signal the latter when the grinding head has been fed against the memory pin 156. Additionally, the machine control circuitry is connected by the conductors 324 to the grinding wheel motor 278 to actuate the latter.

The operation of the apparatus at the grinding station will now be described with reference, first, to the situation in which a lamp need be ground and, secondly, the situations in which the lamp is not to be ground either because the required aiming plane already exists or the lamp is defective or a "good null" was not obtained at the aiming station as aforementioned.

Referring to the first situation, the intermittent drive mechanism 6 is actuated to index the probed lamp into the grinding station at which time the index cam control circuitry 100 acting through the machine control circuitry 98 actuates the magnetic valve 314 to feed the grinding head 267 downwardly against the aiming projections on the lamp. During this downward movement, the motor 278 is supplied with power through conductors 324 to rotate the grinding wheel 282. The grinding wheel removes material from the glass projections 26 as it continues to be fed downwardly thereon until such time as the stop pin 292 engages the memory pin 156. At this time, the grinding head is just beginning to grind the lowest projection on the lamp lens. As grinding and feeding movement of the grinding head 267 continues, the stop pin 292 is reciprocated upwardly until such time as the bushing 296 abuts the bushing 290 as indicated in the full line position of FIG. 11. At this time, the limit switch 306 is tripped thereby signalling the machine control circuitry 98 that the memory pin has been engaged. At the end of the dwell portion of the grinding head in a projection-engaging position, the index cam control circuitry and machine control circuitry will again actuate the magnetic valve 314 to move the grinding head upwardly until such time as this movement is discontinued by actuation of the limit switch 320. Thereafter, the intermittent drive mechanism is again actuated to index the ground lamp to possibly a subsequent station in which further operations, such as a cleaning operation to remove glass flakes from the lamp lens, and ultimately to a station in which the lamp may be removed from the support head.

The aforementioned operation is substantially identical in the situation in which the lamp does not need to be ground or is defective or failed to achieve a "good null" in the aiming station, except that the grinding wheel does not engage the lamp projections. It will be remembered that in such a situation the memory pin 156 is in its fully elevated position which results in stopping the grinding head during its downward movement before it can engage the lamp projections. The limit switch 306 is tripped as before to signal the machine control circuitry that the memory pin has been engaged. At the end of the dwell interval of the grinding head as determined by the index cam control circuitry, the grinding head is retracted as previously described until such time as the switch 320 is energized.

*Summary of operation*

A summary of the entire operation of the apparatus will now follow with particular reference to FIGS. 2, 7 and 12 showing, respectively, the control system for the aiming, probing and grinding stations. Upon actuation of the drive mechanism 6, a support head containing a lamp is indexed into the aiming station 12 at which time a filament thereof is illuminated by a circuit from the source 88 through the conductors 92 to the live terminal 28 and ground terminal 30. If the filament fails to illuminate, this fact is sensed by the pick-up unit 82 and stored in the electric memory unit 94 for use at the probe station in conjunction with the operation of machine control circuitry 98. Assuming the filament is properly illuminated, the elevational aim photocells 58 and 60 and azimuth aim photocells 62 and 64, respectively, provide a voltage output signal from the elevation light intensity detector 68 and azimuth light intensity detector 76. These signals operate, respectively, on the elevational aim-adjustment servo-mechanism 72 and azimuth servo-mechanism 80 to dirigibly adjust the lamp until the direction of the beam cast therefrom is properly located with respect to the aiming screen 56 which forms a reference plane. If a "good null" is not achieved at the aiming station, this information is stored within the electric memory unit 94 for use at the probing station in conjunction with operation of the machine control circuitry. At the end of the dwell interval of the intermittent drive mechanism, the index cam control circuitry has retracted the respective elevational and azimuth servo-mechanisms and the rotatable table is indexed into the probing station where another dwell cycle occurs.

If no null signal was received from the aiming station or the lamp was found to be defective by reason of its filament failing to illuminate, the machine control circuitry functions in the probing station to extend the piston rod 172 to release memory pin 156, followed by a dwell interval and then retraction of the piston rod to lock the memory pin in its upper position. If "good null" was achieved and the lamp is not defective, the machine control circuitry actuates the locking pin motor 170 to extend the rod 172 to release the memory pin 156 which is then projected to its uppermost position. The index cam control circuitry then functions to feed the probing head 174 downwardly so as to engage the probe pins 186 with the respective projections on the lamp lens. If the relative heights of the highest and lowest aiming projections on the lamp are such as to indicate that the lamp need not be ground, the master probe switch is not actuated. Consequently, the probing head 174 returns after its dwell interval followed by return of the motor 170 controlling the locking pin 160. Consequently, under these circumstances, the memory pin will be locked in its uppermost position.

If the master probe switch 202 is actuated, the motor 170 is first actuated to release the locking pin 160 thereby locking the memory pin 156 in an adjusted position as controlled by the motion-transmitting means including the setting pin 224, lever 216, member 198 disposed in the probing head and the lever 190 which is connected to the probe pin 186 engaging the lowest projection. Subsequently, at the end of the dwell interval of the probing head, the machine control circuitry as controlled by the index cam control circuitry will retract the probing head.

Thereafter, the intermittent drive mechanism is again actuated to index the probed lamp into the grinding station where its dwell interval again occurs. At this time, the index cam control circuitry acting through the machine control circuitry 98 actuates the feed motor 270 to reciprocate the grinding head 266 downwardly toward the lamp projections. Upon engaging one or more projections, grinding occurs and continues until such time as the stop pin 292 has been reciprocated upwardly to actuate the limit switch 306. If the lamp is not to be ground, the grinding head will be arrested in its downward movement by engagement of the stop pin 292 with memory pin 156 which is in its upper extreme position thereby preventing any grinding from occurring. Limit switch 306 signals the machine control circuitry that the grinding head has completed a feed cycle. Whether the lamp projections are ground or not, at the end of the dwell interval of the grinding head in its downward position, the index cam control circuitry 100 will function to return the head upwardly until such time as the limit switch 320 is actuated to interrupt this movement.

From the above description of an illustrative embodiment of this invention, it may be seen that I have provided a lamp manufacturing apparatus comprising an aiming station in which a lamp may be dirigibly adjusted so as to locate the direction of the beam projected therefrom in a desired position with respect to a reference plane, a probing station in which the variance between the height of the lowest and highest projections on the lamp may be determined, a master switch mechanism functioning to prevent a grinding operation at a subsequent station if the lamp does not need to be ground in establishing the aforedescribed aiming plane, and further including a lever-actuated motion-transmitting mechanism for positioning the mechanical memory unit in accordance with the position of the lowest projection for a lamp which needs to be ground, and a grinding station including stop means engageable with the aforementioned mechanical memory unit as set in its adjusted position at the probing station to control the grinding operation in accordance with the determination made a the probing station. In particular, it should be noted that I have provided an extremely simple mechanical memory unit for transferring the information determined at the probing station, as to whether or not the aiming projections of a particular lamp should be ground, to the grinding station for use therein, as compared to the relatively complicated electronic-hydraulic system heretofore utilized for such a purpose. It will, however, be readily apparent to those skilled in the art that many modifications can be made in the structure disclosed with respect to the illustrative embodiment and, consequently, it is to be understood that the description of this embodiment is not intended to limit the scope of the invention which is defined by the claims which follow.

I claim:

1. Apparatus for use in the manufacture of pre-aimed projection lamps of the type comprising an integrally joined reflector and lens enclosing a light source, and a plurality of readily re-identifiable surface portions on said lamp defining an aiming plane having a known relation with respect to the direction of a selected portion of the light rays projected from said light source; said apparatus comprising a plurality of independently movable probe means each being yieldably engageable with a respective one of said lamp surface portions to sense the relative heights of the latter, a probe master switch mechanism comprising a first movable member, a master switch mounted on said first member for movement with the latter, a second member movably mounted relative to said first member to control actuation of said switch upon relative movement of said members to a predetermined extent, motion-transmitting means operatively interconnecting said probe means with said probe master switch mechanism, whereby said switch will be actuated upon said probe means sensing a variation in the heights of said lamp surface portions beyond a predetermined extent, cutting tool means selectively operable on said lamp surface portions to remove stock therefrom in forming said aiming plane subsequent to operation of said probe means, and means controlling the feed of said cutting tool means to said lamp surface portions, said probe switch mechanism controlling the operation of said feed controlling means.

2. Apparatus for use in the manufacture of pre-aimed projection lamps of the type comprising an integrally joined reflector and lens enclosing a light source, and a plurality of readily re-identifiable surface portions on said lamp defining an aiming plane having a known relation with respect to the direction of a selected portion of the light rays projected from said light source; said apparatus comprising means for energizing the light source, means for positioning the lamp to project the light beam thereof in a known direction with respect to a reference plane, probe means operable subsequent to operation of said lamp positioning means and engageable with said lamp surface portions to sense the relative heights of the latter, said probe means being in a known position relative to said reference plane, a probe master switch mechanism comprising a movably mounted master switch and a switch-actuating member movably mounted relative to said switch to control actuation of the latter upon relative movement of said switch and switch-actuating member to a predetermined extent, motion-transmitting means operatively connecting said probe means to said probe master switch mechanism, whereby said switch will be actuated upon said probe means sensing a variation in the heights of said lamp surface portions beyond a predetermined limit, cutting tool means in a known position with respect to said reference plane and being selectively operable on said lamp surface portions to remove stock therefrom in forming said lamp aiming plane subsequent to operation of said probe means, and means controlling the feed of said cutting tool means to said lamp surface portions, said probe switch mechanism controlling the operation of said feed controlling means.

3. Apparatus for use in the manufacture of pre-aimed projection lamps of the type comprising an integrally joined reflector and lens enclosing a light source, and a plurality of readily re-identifiable surface portions on said lamp defining an aiming plane having a known relation with respect to the direction of a selected portion of the light rays projected from said light source; said apparatus comprising means for energizing the light source, means for positioning the lamp to project the light beam thereof in a known direction with respect to a reference plane, a plurality of independently movable probe means operable subsequent to operation of said lamp positioning means and each being engageable with a respective one of said lamp surface portions to sense the relative heights of the latter, said probe means being in a known position relative to said reference plane, a probe master switch mechanism comprising a first movable member, a master switch mounted on said first member for movement therewith, a second member movably mounted relative to said first member to control actuation of said switch upon relative movement of said first and second members to a predetermined extent, motion-transmitting means operatively connecting said respective probe means to said probe master switch mechanism to control relative movement of said first and second members, whereby said switch will be actuated upon said probe means sensing a variation in the heights of said lamp surface portions beyond a predetermined limit, cutting tool means in a known position with respect to said reference plane and being selectively operable on said lamp surface portions to remove stock therefrom in forming said lamp aiming plane subsequent to operation of said probe means, and means controlling the feed of said cutting tool means to said lamp surface portions, said probe switch mechanism controlling the operation of said feed controlling means.

4. Apparatus for use in the manufacture of pre-aimed projection lamps of the type comprising an integrally joined reflector and lens enclosing a light source, and a plurality of readily re-identifiable surface portions on said lens defining an aiming plane having a known relation with respect to the direction of a selected portion of the light rays projected from said light source; said apparatus comprising means for energizing the light source, means for positioning the lamp to project the light beam thereof in a known direction with respect to a reference plane, a plurality of independently movable probe means operable subsequent to operation of said lamp positioning means and each being yieldably engageable with a respective one of said lamp lens surface portions to sense the relative heights of the latter, said probe means being in a known position with respect to said reference plane prior to engagement with said lamp lens surface portions, a probe master switch mechanism comprising a first movable member, a master switch mounted on said first member for movement with the latter, a second member movably mounted relative to said first member to control actuation of said switch upon relative movement of said members to a predetermined extent, a plurality of levers pivotally mounted intermediate their respective ends and operatively interconnecting a respective probe means with said probe master switch mechanism, whereby said switch will be actuated upon said probe means sensing a variation in the heights of said lamp surface portions beyond a predetermined extent, cutting tool means in a known position with respect to said reference plane and being selectively operable on said lamp lens surface portions to remove stock therefrom in forming said aiming plane subsequent to operation of said probe means, and means controlling the feed of said cutting tool means to said lamp surface portions, said probe switch mechanism controlling the operation of said feed controlling means.

5. Apparatus for use in the manufacture of pre-aimed projection lamps of the type comprising an integrally joined reflector and lens enclosing a light source, and a plurality of readily re-identifiable surface portions on said lamp defining an aiming plane having a known relation with respect to the direction of a selected portion of the light rays projected from said light source; said apparatus comprising means for energizing the light source, means for positioning the lamp to project the light beam thereof in a known direction with respect to a reference plane, a plurality of independently movable probe means operable subsequent to operation of said lamp positioning means and each being engageable with a respective one of said lamp surface portions to sense the relative heights of the latter, said probe means being in a known position relative to said reference plane, a probe master switch mechanism comprising a movably mounted master switch and a switch-actuating member movably mounted relative to said switch to control actuation of said switch upon relative movement of said switch and switch-actuating member to a predetermined extent, motion-transmitting means operatively connecting said probe means to said probe master switch mechanism, whereby said switch will be actuated upon said probe means sensing a variation in the heights of said lamp surface portions beyond a predetermined limit, stop means adjacent said lamp and settable in accordance with actuation of said switch mechanism, and cutting tool means in a known position with respect to said reference plane and being selectively operable on said lamp surface portions to remove stock therefrom in forming said lamp aiming plane, said tool means being operable subsequent to operation of said probe means and including stop means engageable with said first-named stop means to control engagement of said tool means with said lamp surface portions.

6. Apparatus for use in the manufacture of pre-aimed projection lamps of the type comprising an integrally joined reflector and lens enclosing a light source, and a plurality of readily re-identifiable surface portions on said lens defining an aiming plane having a known relation with respect to the direction of a selected portion of the light rays projected from said light source; said apparatus comprising a rotatable table having a plurality of support heads on each of which a lamp may be supported, and being sequentially indexable among aiming, probing and cutting stations; said aiming station comprising means for energizing the light source, means for adjusting said support head to project the light beam from said lamp in a known direction with respect to a reference plane; said probing station comprising a probing head including means for feeding said head toward and away from said lamp, plural spaced probe pins defining a plane in a known position with respect to said reference plane and yieldably movably mounted in said probe head for engagement with a respective one of said lamp lens surface portions to sense the relative heights of the latter, a mechanical memory pin adjustably mounted on said table adjacent each of said support heads for movement to and retention in a predetermined position relative to the lowest of said lamp surface portions, motion-transmitting means operatively connecting said memory pin to the respective probe pin engaging said lowest lamp surface portion; said cutting station comprising a cutting tool including means for feeding said tool toward and away from said lamp, said tool being disposed in a known position with respect to said reference plane and being selectively operable on said lamp lens surface portions to remove stock therefrom in forming said aiming plane, and stop means on said cutting tool engageable with said memory pin to limit downward feeding movement of said tool against said lamp surface portions.

7. Apparatus for use in the manufacture of pre-aimed projection lamps of the type comprising an integrally joined reflector and lens enclosing a light source, and a plurality of readily re-identifiable surface portions on said lens defining an aiming plane having a known relation with respect to the direction of a selected portion of the light rays projected from said light source; said apparatus comprising a support including a lamp support head, a mechanical memory unit on said support adjacent said lamp support head, said memory unit comprising a memory member movable to a plurality of adjusted heights relative to said support, yieldable means urging said memory member to an extreme height relative to said support, locking means engageable with said memory member to retain the latter in an adjusted position and disengageable therefrom to release said memory member for movement to its extreme height, actuating means sequentially operable on said locking means to disengage and engage the latter with said memory member, means for energizing said light source, means for positioning said lamp support head to project the light beam from the lamp in a known direction with respect to a reference plane, a probing head including means for feeding said head toward and away from a lamp in said support head subsequent to operation of said lamp positioning means, a plurality of independently movable probe means movably mounted on said probing head and each being yieldably engageable with a respective one of said lamp surface portions to sense the relative heights of the latter, said probe means being in a known position relative to said reference plane, motion-transmitting means operatively connecting a respective probe means engaging the lowest lamp surface portion and said memory member to reciprocate the latter into an adjusted position in accordance with the position of said lowest lamp surface portion, cutting tool means disposed in a known position with respect to said reference plane including means for feeding said tool means toward and away from said lamp surface portions subsequent to operation of said probing head, and stop means on said tool means engageable with said memory member to limit feeding movement of said tool means toward said lamp surface portions.

8. Apparatus for use in the manufacture of pre-aimed projection lamps of the type comprising an integrally joined reflector and lens enclosing a light source, and a plurality of readily re-identifiable surface portions on said lens defining an aiming plane having a known relation with respect to the direction of a selected portion of the light rays projected from said light source; said apparatus comprising a lamp support including a lamp support head, a mechanical memory unit on said support adjacent said lamp support head, said memory unit comprising a memory pin reciprocable along its axis, a locking pin reciprocable along its axis at an angle to and intersecting said memory pin axis, yieldable means urging said memory and locking pins toward intersection with each other, locking surfaces on said memory and locking pins at angles to their respective axes, whereby said memory pin may be moved against its yieldable means and locked in a plurality of adjusted positions by said locking pin upon engagement of said locking surfaces, means for energizing said light source, means for positioning the lamp to project the light beam thereof in a known direction with respect to a reference plane, a probing head, a plurality of independently movable probe means movably mounted on said probing head in a known position relative to said reference plane and each being yieldably engageable with a respective one of said lamp surface portions to sense the relative heights of the latter subsequent to operation of said lamp positioning means, motion-transmitting means operatively connecting a respective probe means engaging the lowest lamp surface portion and said memory pin to reciprocate said memory unit memory pin into an adjusted position in accordance with the position of said lowest lamp surface portion, cutting tool means disposed in a known position with respect to said reference plane and including means for feeding said tool means toward and away from said lamp surface portions subsequent to operation of said probe means, and stop means carried by said tool means and engageable with said memory pin to limit feeding movement of said tool means toward said lamp surface portions.

9. Apparatus for performing an operation on a plurality of selected portions of successive work-pieces in which the relative heights of said selected work-piece portions vary, said apparatus comprising a work-piece support, a mechanical memory unit adjacent said work-piece support, said memory unit comprising a memory member movable to a plurality of adjusted heights relative to said support, yieldable means urging said memory member to an extreme height relative to said support, locking means engageable with said memory member to retain the latter in an adjusted position and disengageable therefrom to release said memory member for movement to its extreme height, a probing head including motor means for feeding said probing head downwardly toward and upwardly from said work-piece support, a plurality of independently-movable probe means each being yieldably engageable with a respective one of said work-piece surface portions to sense the relative heights of the latter, motion-transmitting means carried by said probing head and operatively connecting said memory member to a respective probe means engaging the lowest surface portion on said work-piece, whereby said memory member is adjusted and retained in a predetermined position relative to said lowest surface portion, a cutting tool mechanism including motor means for feeding said mechanism downwardly upon and upwardly from said work-piece surface portions to perform work on the latter, and stop means on said tool mechanism engageable with said memory member to limit downward feeding movement of said tool mechanism toward said work-piece surface portions.

10. Apparatus for performing an operation on a plurality of selected portions of successive work-pieces in which the relative heights of said selected work-piece portions vary, said apparatus comprising spaced work-piece supports on a rotatable table which is selectively indexable between probing and work-performing stations, a mechanical memory unit on said table adjacent each of said work-piece supports, each of said memory units comprising a memory pin reciprocable vertically along its axis and relative to said table, yieldable means urging said memory pin upwardly, a locking pin reciprocable horizontally along its axis and relative to said table, yieldable means urging said locking pin into intersecting engagement with said memory pin, locking surfaces on said memory and locking pins at angles to their respective axes, whereby said memory pin may be locked in a plurality of adjusted positions by said locking pin upon engagement of said locking surfaces under the influence of the respective memory and locking pin yieldable means; said probing station comprising a probing head, motor means for feeding said probing head downwardly toward and upwardly from a work-piece support, a plurality of independently movable probe means each being yieldably engageable with a respective one of said surface portions to sense the relative heights of the latter, motion-transmitting means carried by said probing head and operatively connecting said memory pin to a respective probe means engaging the lowest surface portion on said work-piece, motor means fixed relative to said table and selectively actuable for moving said locking pin against its yieldable means to disengage said locking surfaces to release said memory pin, and actuable to release said locking pin to engage said memory pin in an adjusted position of the latter; said work-performing station comprising a cutting tool head including motor means for feeding said head downwardly upon and upwardly from said work-piece surface portions to perform work on the latter, and stop means on said tool head engageable with said memory pin to limit downward feeding movement of said tool head toward said work-piece surface portions.

11. Apparatus for performing an operation on a plurality of selected portions of successive work-pieces in which the relative heights of said selected work-piece portions vary, said apparatus comprising spaced work-piece supports on a rotatable table which is selectively indexable between probing and work-performing stations, a mechanical memory unit on said table adjacent each of said work-piece supports, each of said memory units comprising a memory pin reciprocable vertically along its axis and relative to said table, yieldable means urging said memory pin upwardly, a locking pin reciprocable horizontally along its axis and relative to said table, yieldable means urging said locking pin into intersecting engagement with said memory pin, locking surfaces on said memory and locking pins at angles to their respective axes, whereby said memory pin may be locked in a plurality of adjusted positions by said locking pin upon engagement of said locking surfaces under the influence of the respective memory and locking pin yieldable means; said probing station comprising a probing head, motor means for feeding said probing head downwardly toward and upwardly from a work-piece support, a plurality of independently movable probe means each being yieldably engageable with a respective one of said lamp surface portions to sense the relative heights of the latter, motion-transmitting means carried by said probing head and operatively connecting said memory pin to a respective probe means engaging the lowest surface portion on said work-piece, motor means fixed relative to said table and selectively actuable for moving said locking pin against its yieldable means to disengage said locking surfaces to release said memory pin, and actuable to release said locking pin to engage said memory pin in an adjusted position of the latter, circuit means alternately controlling the operation of said locking pin motor means and probe head motor means whereby said locking pin motor means may be actuated to release said locking pin for locking engagement with said memory pin in its adjusted position prior to or after movement of said probing head upwardly from said work-piece surface portions; said work-performing station comprising a cutting tool head including motor means for feeding said tool head downwardly upon and upwardly from said work-piece surface portions to perform work thereon, and stop means on said tool head engageable with said memory pin to limit downward feeding movement of said tool head toward said work-piece surface portions.

12. Apparatus for use in the manufacture of pre-aimed projection lamps of the type comprising a lens having a spherical radius and rigidly secured to a reflector, said apparatus comprising an aiming head in which one of said lamps may be supported, a universal socket support for said head with the pivotal center of said socket support spaced from the lamp lens a distance equal to the spherical radius of the latter, a pair of translatable and pivotal aiming mechanisms secured to said aiming head at points spaced ninety degrees apart, the respective pivot axes of said mechanisms defining with said socket pivotal center a pair of coordinate aiming axes, means defining a reference plane, means for translating said aiming mechanisms to adjust said head about said coordinate aiming axes to project the light beam from said lamp in a known direction with respect to said reference plane, and grinding means in a known position relative to said reference plane and operable on plural spaced surface portions of the lamp to define an aiming plane having a known relation to said reference plane.

13. Apparatus for use in the manufacture of pre-aimed projection lamps of the type comprising an integrally joined reflector and lens enclosing a light source, said lens having a spherical radius, said apparatus comprising an aiming head in which one of said lamps may be supported, a universal socket support for said head with the pivotal center of said socket support spaced from the lamp lens a distance equal to the spherical radius of the latter, a pair of translatable and pivotal aiming mechanisms secured to said aiming head at points spaced ninety degrees apart, the respective pivot axes of said mechanisms defining with said socket pivotal center a pair of coordinate aiming axes, means defining a reference plane, means for energizing said light source, means for translating each of said aiming mechanisms to pivotally adjust said head about the axis defined by said socket pivotal center and the pivot axis of the other of said mechanisms to project the light beam from the lamp in a known direction with respect to said reference plane, and grinding means in a known position relative to said reference plane and operable on plural spaced surface portions of a lamp to define an aiming plane having a known relation to said reference plane.

14. Apparatus for use in the manufacture of pre-aimed projection lamps of the type comprising an integrally joined reflector and lens enclosing a light source, said apparatus comprising a rotatable table having a plurality of support heads on each of which a lamp may be supported, and being sequentially indexable among aiming, probing and grinding stations, a universal socket connection between said support head and table with the pivotal center of said socket spaced from said lamp lens a distance equal to the spherical radius of the latter, a pair of translatable and pivotal arm means secured to said support head and spaced ninety degrees from each other, the respective axes of said arm means defining with said socket pivotal center a pair of coordinate aiming axes; said aiming station comprising means for energizing the light source, means for translating said arm means about said coordinate aiming axes to project the light beam from said lamp in a known direction with respect to a reference plane; said probing station comprising a probing head including means for feeding said head toward and away from said lamp, plural spaced probe pins defining a plane in a known position with respect to said reference plane and yieldably movably mounted in said probe head for engagement with selected lamp lens surface portions to sense the relative heights of the latter, a mechanical memory pin adjustably mounted on said table adjacent each of said support heads for movement to and retention in a predetermined position relative to the lowest of said lamp surface portions, motion-transmitting means operatively connecting said memory pin to the respective probe pin engaging said lowest lamp surface portion; said grinding station comprising a grinding head including means for feeding said head toward and away from said lamp, said head being disposed in a known position with respect to said reference plane and being selectively operable on said lamp lens surface portions to remove stock therefrom in forming an aiming plane, and stop means on said grinding head engageable with said memory pin to limit downward feeding movement of said head against said lamp surface portions.

15. Apparatus for performing an operation on a plurality of selected portions of successive work-pieces in which the relative heights of said selected work-piece portions vary, said apparatus comprising a work-piece support, a plurality of independently movable probe means each being yieldably engageable with a respective one of said work-piece portions to sense the relative heights of the latter, a probe master switch mechanism comprising a first movable member, a master switch mounted on said first member for movement with the latter, a second member movably mounted relative to said first member to control actuation of said switch upon relative movement of said members to a predetermined extent, motion-transmitting means operatively interconnecting said probe means with said probe master switch mechanism, whereby said switch will be actuated upon said probe means sensing a variation in the heights of said work-piece portions beyond a predetermined extent, cutting tool means selectively operable on said work-piece portions to remove stock therefrom subsequent to operation of said probe means, and means controlling the feed of said cutting tool means to said work-piece portions, said probe switch mechanism controlling the selective operation of said feed controlling means.

References Cited in the file of this patent

UNITED STATES PATENTS

| | | |
|---|---|---|
| 2,297,950 | Flaws | Oct. 6, 1942 |
| 2,880,557 | Todd et al. | Apr. 7, 1959 |